(12) United States Patent
Kunita

(10) Patent No.: US 8,008,366 B2
(45) Date of Patent: Aug. 30, 2011

(54) CURABLE COMPOSITION AND PROCESS FOR PRODUCING CURED COATING

(75) Inventor: Kazuto Kunita, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 625 days.

(21) Appl. No.: 12/027,648

(22) Filed: Feb. 7, 2008

(65) Prior Publication Data

US 2008/0200581 A1 Aug. 21, 2008

(30) Foreign Application Priority Data

Feb. 20, 2007 (JP) ................. 2007-039379

(51) Int. Cl.
*C08F 2/42* (2006.01)
*C08F 2/54* (2006.01)
*C08J 3/28* (2006.01)

(52) U.S. Cl. ............ 522/178; 522/31; 522/63; 522/65; 522/66; 522/74; 522/75; 522/116; 522/118; 522/113; 522/120; 522/114; 522/136; 522/151; 522/180; 522/183; 522/182; 522/181; 427/496; 427/500; 427/504; 523/300

(58) Field of Classification Search ............ 522/31, 522/63, 65, 66, 75, 116, 118, 113, 120, 136, 522/151, 180, 178, 183, 114; 427/496, 500, 427/504; 523/300
See application file for complete search history.

(56) References Cited

U.S. PATENT DOCUMENTS 6,051,367 A * 4/2000 Kunita et al. ............ 430/281.1
6,476,092 B1 * 11/2002 Kunita ...................... 522/31
6,787,622 B2 * 9/2004 Kunita ...................... 526/257
6,818,372 B2 * 11/2004 Kunita et al. ............ 430/138

FOREIGN PATENT DOCUMENTS

JP 2001-092127 A 4/2001
JP 2002-105128 A 4/2002

* cited by examiner

*Primary Examiner* — Sanza L McClendon
(74) *Attorney, Agent, or Firm* — Sughrue Mion, PLLC

(57) ABSTRACT

A process for producing a cured coating is provided that includes a step of forming on a substrate layer of a curable composition that includes at least one compound represented by Formula (I) and a step of curing the layer of the curable composition by irradiation with electron beam.

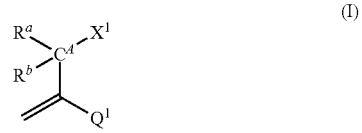

(I)

In formula (I), $Q^1$ denoted a cyano group or a —$COX^2$ group, $X^1$ denoted a hydrogen atom, organic residue, or polymer chain bonded to carbon atom $C^A$ via a heteroatom, or a halogen atom, $X^2$ denoted a hydrogen atom, organic residue, or polymer chain boned to the carbonyl group via a heteroatom, or a halogen atom, $R^a$ and $R^b$ independently denote a hydrogen atom, a halogen atom, a cyano group, or an organic residue, and $X^1$ and $X^2$, $R^a$ and $R^b$, and $X^1$ and $R^a$ or $R^b$ may be bonded to each other to form a cyclic structure. There is also provided an electron beam-curable composition that includes a compound represented by Formula (I).

10 Claims, No Drawings

CURABLE COMPOSITION AND PROCESS FOR PRODUCING CURED COATING

BACKGROUND OF THE INVENTION

1. Field of the Invention

The present invention relates to a curable composition that can be used in a paint, an ink, an adhesive, a pressure sensitive adhesive, etc., the composition having excellent adhesion to an organic polymer substrate. Furthermore, the present invention relates to a process for producing a cured coating having excellent adhesion to an organic polymer substrate.

2. Description of the Related Art

Among curable compositions, there are curable compositions that are cured by various types of energy such as light, heat, and an electron beam, and when improvement in the productivity of a production process (processing speed and reduction in the amount of energy applied) is taken into consideration, a photocurable composition and an electron beam-curable composition are suitably used.

As a photocurable composition, a radical polymerization system is often used, and from the viewpoint of improvement in productivity there is a demand for a radical polymerization system having high curing speed and higher sensitivity. As an attempt to increase the sensitivity of the radical polymerization system, various investigations have been carried out into photopolymerization initiators, polymerizable compounds, etc., and as high sensitivity polymerizable compounds, polymerizable compounds, etc. described in JP-A-2001-92127 and JP-A-2002-105128 have been disclosed (JP-A denotes a Japanese unexamined patent application publication). Furthermore, an attempt has been made to suppress inhibition of polymerization by oxygen in air, which is the main cause of lower sensitivity.

On the other hand, as an electron beam-curable composition a radical polymerization system is suitably used from the viewpoint of productivity. In the case of an electron beam, unlike light, since the generation of an electron beam has to be carried out under vacuum, inhibition of polymerization by oxygen is not an issue in the process. Furthermore, since a polymerizable compound receives the electron beam directly and starts to polymerize, the presence of an initiator is unnecessary. Moreover, due to the properties of an electron beam, when forming a coating, a reaction proceeds sufficiently with respect to the depth direction from the coating surface to the interface with a substrate, and there is the merit that the reaction proceeds rather easily at the interface with the substrate, which has high density of materials. In the case of light, with respect to the depth direction of a photocurable coating, light is absorbed on the coating surface and a reaction occurs easily, but it is difficult for it to proceed at the interface between the curable coating and the substrate.

However, on the other hand, in the case of a high output electron beam, there are the problems that chemical bonds of the substrate itself are broken, and particularly when an organic compound is used as the substrate, bond cleavage, etc. occurs, thus generating a gas, changing the chemical structure, or changing the physical properties of the substrate surface, and there is a recent trend to utilize a low energy electron beam. However, when a low output is employed, if a curable composition is made to have a high sensitivity that is at a level suitable for a production process, the structure of the polymerizable compound is limited to a structure that is suitable for polymerization by an electron beam.

That is, it is fundamentally important for a curable composition to give a polymerized coating that exhibits physical properties and functions in terms of tackiness, adhesion, elasticity, hardness, hydrophilicity, and electroconductivity, but since there is a restriction on the chemical structure of the curable compound, the variation thereof is narrowed, which is a serious problem.

BRIEF SUMMARY OF THE INVENTION

It is an object of the present invention to provide an electron beam-curable composition that is highly sensitive to an electron beam, has excellent storage stability, and can form on an organic polymer substrate a coating with good adhesion, and to provide a process for producing on an organic polymer substrate a cured coating having excellent adhesion.

The object has been attained by the following means.

(1) A process for producing a cured coating, the process comprising a step of forming on a substrate a layer of a curable composition comprising at least one compound represented by Formula (I) and a step of curing the layer of the curable composition by irradiating with an electron beam,

in Formula (I), $Q^1$ denotes a cyano group or a —$COX^2$ group, $X^1$ denotes a hydrogen atom, organic residue, or polymer chain bonded to carbon atom $C^A$ via a heteroatom, or a halogen atom, $X^2$ denotes a hydrogen atom, organic residue, or polymer chain bonded to the carbonyl group via a heteroatom, or a halogen atom, $R^a$ and $R^b$ independently denote a hydrogen atom, a halogen atom, a cyano group, or an organic residue, and $X^1$ and $X^2$, $R^a$ and $R^b$, and $X^1$ and $R^a$ or $R^b$ may be bonded to each other to form a cyclic structure, (2) the process for producing a cured coating according to (1), wherein the curable composition does not comprise a polymerization initiator, (3) the process for producing a cured coating according to (1), wherein the only polymerizable component contained in the curable composition is a compound represented by Formula (I), (4) the process for producing a cured coating according to (1), wherein $X^1$ is an organic residue or polymer chain that has at least one bond selected from the group consisting of an ether bond, a carboxylic acid ester bond, a thioether bond, and a thioester bond, (5) the process for producing a cured coating according to (4), wherein $X^1$ is a group selected from the group consisting of a hydroxy group, a substituted oxy group, a mercapto group, a substituted thio group, an amino group, a substituted amino group, a sulfo group, a substituted sulfo group, a sulfonato group, a substituted sulfinyl group, a substituted sulfonyl group, a phosphono group, a substituted phosphono group, a phosphonato group, a substituted phosphonato group, a nitro group, and a heterocyclic group linked via a heteroatom, or a polymer chain bonded to carbon atom $C^A$ via an oxygen atom, a nitrogen atom, a sulfur atom, or a phosphorus atom, (6) the process for producing a cured coating according to (1), wherein $Q^1$ is a —$COX^2$ group, (7) the process for producing a cured coating according to (6), wherein $X^2$ is a hydroxy group, a substituted oxy group, a mercapto group, a substituted thio group, an amino group, a substituted amino group, a heterocyclic group (provided that it is linked to the carbonyl group via a heteroatom in the heterocycle), or a polymer chain bonded to the carbonyl group via a heteroatom, (8) the process for producing a cured coating according to (1), wherein the electron beam-curable composition comprises a colorant, (9) the process for producing a cured coating according to (1), wherein the electron beam-curable composition comprises a surfactant,

(10) the process for producing a cured coating according to (1), wherein the substrate is an organic polymer substrate,

(11) the process for producing a cured coating according to (1), wherein the acceleration voltage for irradiation with the electron beam is 5 to 150 kV,

(12) the process for producing a cured coating according to (1), wherein the irradiance of the electron beam is 1 to 200 kGy,

(13) the process for producing a cured coating according to (1), wherein the cured coating has a thickness of 0.1 to 1,000 μm, and

(14) an electron beam-curable composition comprising a compound represented by Formula (I),

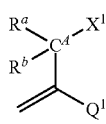

(I)

in Formula (I), $Q^1$ denotes a cyano group or a —$COX^2$ group, $X^1$ denotes a hydrogen atom, organic residue, or polymer chain bonded to carbon atom $C^A$ via a heteroatom, or a halogen atom, $X^2$ denotes a hydrogen atom, organic residue, or polymer chain bonded to the carbonyl group via a heteroatom, or a halogen atom, $R^a$ and $R^b$ independently denote a hydrogen atom, a halogen atom, a cyano group, or an organic residue, and $X^1$ and $X^2$, $R^a$ and $R^b$, and $X^1$ and $R^a$ or $R^b$ may be bonded to each other to form a cyclic structure.

DETAILED DESCRIPTION OF THE INVENTION (1) Electron Beam-Curable Composition

The electron beam-curable composition of the present invention comprises a compound shown in Formula (I). Furthermore, the electron beam-curable composition of the present invention preferably comprises a colorant. It may further comprise a dispersant, a surfactant, etc. as necessary.

The electron beam-curable composition of the present invention can be cured by irradiation with an electron beam; the 'electron beam' is an electron beam having a substantially constant kinetic energy, and irradiation therewith enables a polymerization-initiating species to be generated in the electron beam-curable composition, thus curing the electron beam-curable composition.

The electron beam-curable composition of the present invention preferably does not comprise a polymerization initiator.

Furthermore, it is preferable that the only polymerizable component in the electron beam-curable composition of the present invention is a compound shown in Formula (I).

Components contained in the electron beam-curable composition of the present invention are explained below.

The electron beam-curable composition of the present invention comprises a compound represented by Formula (I).

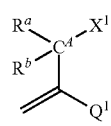

(I)

In Formula (I), $Q^1$ denotes a cyano group or a —$COX^2$ group, $X^1$ denotes a hydrogen atom, organic residue, or polymer chain bonded to carbon atom $C^A$ via a heteroatom, or a halogen atom, $X^2$ denotes a hydrogen atom, organic residue, or polymer chain bonded to the carbonyl group via a heteroatom, or a halogen atom, $R^a$ and $R^b$ independently denote a hydrogen atom, a halogen atom, a cyano group, or an organic residue, and $X^1$ and $X^2$, $R^a$ and $R^b$, and $X^1$ and $R^a$ or $R^b$ may be bonded to each other to form a cyclic structure.

In the present invention, the compound represented by Formula (I) has at least one ethylenically unsaturated group in which two substituents are bonded to one of the carbon atoms forming the ethylenically unsaturated double bond.

$X^1$ denotes a hydrogen atom, organic residue, or polymer chain that is bonded via a heteroatom to carbon atom $C^A$ in Formula (I), that is, an α-carbon atom of the ethylenically unsaturated bond, or a halogen atom. When $Q^1$ is —$COX^2$, $X^2$ denotes a hydrogen atom, organic residue, or polymer chain that is bonded to the carbonyl group via a heteroatom, or a halogen atom.

$X^1$ and $X^2$ may be monovalent organic residues, the $X^1$s or $X^2$s may be linked together via a divalent or n-valent organic linking group to give a difunctional or n-functional type, or they may give a polymer type by forming a monomer unit residue in an oligomer or polymer.

Typical compound groups i) to iv) represented by Formula (I) are explained below.

The compound represented by Formula (I) is i) a monofunctional type ethylenically unsaturated compound (compound examples A-1 to A-42), listed later, when $Q^1$ denotes —$COX^2$ and $X^1$ and $X^2$ are hydrogen atoms or monovalent organic residues bonded to carbon atom $C^A$ or the carbonyl group via a heteroatom, or halogen atoms, and is a monofunctional type ethylenically unsaturated compound having a cyclic structure (compound examples B-1 to B-9) when $X^1$ and $X^2$, $R^a$ and $R^b$, or $X^1$ and $R^a$ or $R^b$ are bonded to each other to form a cyclic structure.

The compound represented by Formula (I) is ii) a difunctional type ethylenically unsaturated compound (compound examples C-1 to C-14) when $Q^1$ denotes —$COX^2$ and $X^1$ is a hydrogen atom or monovalent organic residue bonded to carbon atom $C^A$ via a heteroatom, or a halogen atom, and $X^2$ is a divalent group bonded to two carbonyl groups via a heteroatom, and is also a difunctional type ethylenically unsaturated compound (compound examples D-1 to D-30) when $X^1$ is a divalent organic residue bonded to two carbon atoms A via a heteroatom and $X^2$ is a hydrogen atom, a monovalent organic residue, or a halogen atom.

The compound represented by Formula (I) is iii) an n-functional type ethylenically unsaturated compound having three or more functional groups (compound examples E-1 to E-22) when $X^1$ is a monovalent group, $Q^1$ denotes —$COX^2$, and $X^2$ is an n-valent organic residue (n≧3), and is also an n-functional type ethylenically unsaturated compound (compound examples F-1 to F-10) when $X^1$ is an n-valent organic residue ($n \geq 3$; n denotes an integer of 3 or greater) and $X^2$ is a hydrogen atom, a monovalent organic residue, or a halogen atom.

Furthermore, the compound represented by Formula (I) is iv) a polymer type ethylenically unsaturated compound (compound examples G-1 to G-15) when $X^1$ or $Q^1$ denote —$COX^2$, and either one of the $X^1$ and $X^2$, and preferably $X^2$, is a monomer unit residue of an oligomer or a polymer formed by addition polymerization or addition copolymerization.

With regard to the compound represented by Formula (I), when $Q^1$ denotes a cyano group, as in the case in which $Q^1$ is $COX^2$, it can be i) a monofunctional type, ii) a difunctional type, iii) a polyfunctional type, and iv) a polymer type compound, which are listed later.

When $Q^1$ denotes —$COX^2$ or —CN, a person skilled in the art can of course produce a large number of compound variations in addition to the above-mentioned four compound groups.

In the above-mentioned polymer type ethylenically unsaturated compounds, at least one of $X^1$ and $X^2$ is bonded to a main chain of a polymer. That is, a configuration is employed in which a structure derived from Formula (I) is present in a side chain of a polymer chain. Examples of the polymer include the following linear organic macromolecular polymers.

That is, examples include polyurethane, novolac, vinyl-based polymers such as polyvinyl alcohol, polyhydroxystyrene, polystyrene, poly(meth)acrylic acid ester, and poly(meth)acrylamide, and polyacetal. These polymers may be homopolymers or copolymers.

In Formula (I) $Q^1$ is a cyano group or a —$COX^2$ group, and in $X^1$ or $X^2$ the heteroatom bonded to carbon atom $C^A$ or the carbonyl group and to the organic residue, etc. means an atom other than carbon, and preferably a non-metallic atom; specific examples thereof include an oxygen atom, a sulfur atom, a nitrogen atom, and a phosphorus atom, an oxygen atom and a sulfur atom are preferable, and an oxygen atom is more preferable.

When $X^1$ or $X^2$ is a halogen atom, examples thereof include a chlorine atom, a bromine atom, an iodine atom, a fluorine atom, etc., and a chlorine atom and a bromine atom are preferable.

$X^1$ is preferably a group selected from the group consisting of a hydroxy group, a substituted oxy group, a mercapto group, a substituted thio group, an amino group, a substituted amino group, a sulfo group, a substituted sulfo group, a sulfonato group, a substituted sulfinyl group, a substituted sulfonyl group, a phosphono group, a substituted phosphono group, a phosphonato group, a substituted phosphonato group, a nitro group, and a heterocyclic group (provided that it is linked to carbon atom $C^A$ via a heteroatom in the heterocycle), or a polymer chain bonded to carbon atom $C^A$ via an oxygen atom, a nitrogen atom, a sulfur atom, or a phosphorus atom, is more preferably a substituent having at least two oxygen atoms and/or sulfur atoms, is yet more preferably an organic residue or polymer chain, bonded to carbon atom $C^A$ via at least one heteroatom, that is selected from the group consisting of a plurality of ether bonds, carboxylic acid ester bonds, thioether bonds, and thioester bonds, and is particularly preferably an organic residue or polymer chain bonded to carbon atom $C^A$ via an oxygen atom of a plurality of ether bonds or carboxylic acid ester bonds.

$X^2$ is preferably a hydrogen atom, organic residue, or polymer chain bonded to the carbonyl group via a heteroatom, and preferred examples thereof include a hydroxy group, a substituted oxy group, a mercapto group, a substituted thio group, an amino group, a substituted amino group, a heterocyclic group (provided that it is linked to the carbonyl group via a heteroatom in the heterocycle), and a polymer chain bonded to the carbonyl group via a heteroatom.

$R^a$ and $R^b$ independently denote a hydrogen atom, a halogen atom, a cyano group, or an organic residue, and the organic residue is preferably a hydrocarbon group, a substituted oxy group, a substituted thio group, a substituted amino group, a substituted carbonyl group, or a carboxylate group that may have a substituent and may contain an unsaturated bond. Furthermore, $R^a$ and $R^b$ may be bonded to each other to form a cyclic structure.

Examples of substituents allowed for $X^1$, $X^2$, $R^a$, and $R^b$ in Formula (I) are now shown. These substituents include a hydrocarbon group that may have a further substituent and may contain an unsaturated bond, an acyl group, and a heterocyclic group.

Examples of the hydrocarbon group that may have a substituent and may contain an unsaturated bond include an alkyl group, a substituted alkyl group, an aryl group, a substituted aryl group, an alkenyl group, a substituted alkenyl group, an alkynyl group, and a substituted alkynyl group.

Examples of the acyl group include an alkylcarbonyl group, an arylcarbonyl group, an alkylsulfonyl group, and an arylsulfonyl group.

Examples of the heterocyclic group include five- or six-membered heterocyclic groups containing a nitrogen atom, an oxygen atom, or a sulfur atom as a heteroatom, and a group in which the above heterocyclic group is fused with an aromatic group.

Examples of the alkyl group include straight-chain, branched, or cyclic alkyl groups having 1 to 20 carbon atoms, and specific examples thereof include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, an s-butyl group, a t-butyl group, an isopentyl group, a neopentyl group, a 1-methylbutyl group, an isohexyl group, a 2-ethylhexyl group, a 2-methylhexyl group, a cyclohexyl group, a cyclopentyl group, and a 2-norbornyl group. Among them, a straight-chain alkyl group having 1 to 12 carbon atoms, a branched alkyl group having 3 to 12 carbon atoms, and a cyclic alkyl group having 5 to 10 carbon atoms are more preferable.

The substituted alkyl group is a group formed by bonding between a substituent and an alkylene group; examples of the substituent include a monovalent non-metallic atom (atomic group) other than hydrogen, and any atom or group that does not inhibit polymerization of a compound represented by Formula (I) is allowed. The substituted alkenyl group, the substituted alkynyl group, and the substituted aryl group can be defined in the same manner. Among these groups, preferred examples of the substituent include a halogen atom (—F, —Br, —Cl, —I), a hydroxy group, an alkoxy group, an aryloxy group, an acyloxy group, a cyano group, an alkyl group, and an aryl group. Other allowable substituents are described in paragraphs 0017 to 0041 of JP-A-2001-92127.

Preferred examples of the aryl group include an aromatic group having 6 to 20 carbon atoms, a fused ring formed from 2 or 3 benzene rings, and a fused ring formed from a benzene ring and a 5-membered unsaturated ring. Specific examples thereof include a phenyl group, a naphthyl group, an anthryl group, a phenanthryl group, an indenyl group, an acenaphthenyl group, and a fluorenyl group, and among them a phenyl group and a naphthyl group are preferable.

As the alkenyl group, a group having 2 to 20 carbon atoms is preferable. The substituted alkenyl group is a group in which a hydrogen atom of the alkenyl group is replaced by a substituent bonded to the group, and as this substituent a substituent described above for the substituted alkyl group may be used.

The alkynyl group preferably has 2 to 20 carbon atoms. The substituted alkynyl group is a group in which a hydrogen atom of an alkynyl group is replaced by a substituent bonded to the group, and as this substituent a substituent described above for the substituted alkyl group may be used.

Examples of the cyclic structure formed by bonding between $X^1$ and $X^2$, $R^a$ and $R^b$, or $X^1$ and $R^a$ or $R^b$ are now shown. Preferred examples of an aliphatic ring formed by bonding between $X^1$ and $X^2$, $R^a$ and $R^b$, or $X^1$ and $R^a$ or $R^b$ include 4-membered, 5-membered, 6-membered, 7-membered, and 8-membered aliphatic rings, and more preferred examples thereof include 4-membered, 5-membered, and 6-membered aliphatic rings. They may further have a substituent on a carbon atom forming these rings (examples of the substituent include substituents allowed for the substituted alkyl group described above), and some of the ring-forming carbon atoms may be replaced by a heteroatom (oxygen atom, sulfur atom, nitrogen atom, etc.). Furthermore, part of the aliphatic ring may form part of an aromatic ring.

The compound represented by Formula (I) is preferably a compound represented by Formulae (I-A) to (I-F) below or a compound having a structural unit represented by Formulae (I-G-1) to (I-G-4) below.

Among the compounds represented by Formula (I), as the monofunctional type compound i), compounds represented by Formula (I-A) or Formula (I-B) are preferable.

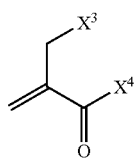

(I-A)

$X^3$ in Formula (I-A) denotes a hydrogen atom or monovalent organic residue bonded via a heteroatom, or a halogen atom, and $X^4$ denotes a monovalent organic residue bonded via a heteroatom.

$X^3$ in Formula (I-A) is preferably a hydrogen atom or monovalent organic residue bonded via an oxygen atom, a sulfur atom, or a nitrogen atom, or a halogen atom, is more preferably a hydroxy group, a heterocyclic group bonded via a heteroatom, a straight-chain or branched alkoxy group having 1 to 10 carbon atoms, a straight-chain or branched substituted alkoxy group having 1 to 15 carbon atoms, an acyloxy group having 1 to 10 carbon atoms, an aryloxy group having 6 to 12 carbon atoms, or a substituted aryloxy group having 6 to 20 carbon atoms, and is yet more preferably a straight-chain or branched substituted alkoxy group having 1 to 10 carbon atoms or the below heterocyclic groups bonded via a sulfur atom.

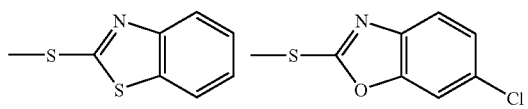

$X^4$ in Formula (I-A) is preferably a monovalent organic residue bonded via an oxygen atom, is more preferably a hydroxy group, a straight-chain or branched alkoxy group having 1 to 12 carbon atoms, a straight-chain or branched substituted alkoxy group having 1 to 20 carbon atoms, an aryloxy group having 6 to 18 carbon atoms, or a substituted aryloxy group having 6 to 20 carbon atoms, and is yet more preferably a straight-chain or branched alkoxy group having 1 to 6 carbon atoms.

Preferred examples of the substituent in the substituted alkoxy group and substituted aryloxy group include a halogen atom (—F, —Br, —Cl, —I), a hydroxy group, an alkoxy group having 1 to 6 carbon atoms, an aryloxy group having 6 to 12 carbon atoms, an acyloxy group having 2 to 5 carbon atoms, a cyano group, a straight-chain or branched alkyl group having 1 to 8 carbon atoms, and an aryl group having 6 to 12 carbon atoms.

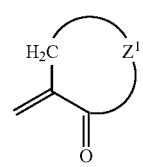

(I-B)

$Z^1$ in Formula (I-B) denotes a divalent linking group having at both ends a heteroatom such as an oxygen atom, a nitrogen atom, or a sulfur atom.

The ring containing $Z^1$ in Formula (I-B) is preferably an aliphatic ring, is more preferably a 4-membered, 5-membered, 6-membered, 7-membered, or 8-membered aliphatic ring, and is yet more preferably a 4-membered, 5-membered, or 6-membered aliphatic ring. Furthermore, some of the ring members may be replaced by a heteroatom (an oxygen atom, a sulfur atom, a nitrogen atom, etc.) other than a carbon atom. That is, the divalent linking group may have a heteroatom in addition to the heteroatoms at both ends. Furthermore, part of the aliphatic ring may form part of an aromatic ring.

Moreover, it may have a substituent on a carbon atom or heteroatom forming the ring. Examples of the substituent include an alkyl group having 1 to 6 carbon atoms, an aryl group having 6 to 12 carbon atoms, and an oxy group (═O).

Among the compounds represented by Formula (I), as the difunctional type compound ii), compounds represented by Formula (I-C) or Formula (I-D) are preferable.

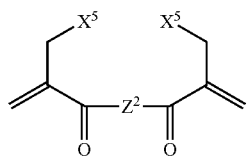

(I-C)

In Formula (I-C), the $X^5$s independently denote a hydrogen atom or monovalent organic residue bonded via an oxygen atom, and $Z^2$ denotes a divalent linking group having a heteroatom at both ends.

$X^5$ in Formula (I-C) is preferably a hydroxy group, a straight-chain or branched alkoxy group having 1 to 10 carbon atoms, a straight-chain or branched substituted alkoxy group having 1 to 10 carbon atoms, an acyloxy group having 2 to 10 carbon atoms, an aryloxy group having 6 to 12 carbon atoms, or a substituted aryloxy group having 6 to 20 carbon atoms, and is more preferably a hydroxy group, an alkoxy group having 1 to 5 carbon atoms, or a substituted alkoxy group having 1 to 5 carbon atoms.

Preferred examples of the substituent in the substituted alkoxy group and substituted aryloxy group include a halogen atom (—F, —Br, —Cl, —I), a hydroxy group, an alkoxy group having 1 to 5 carbon atoms, an aryloxy group having 6 to 12 carbon atoms, an acyloxy group having 2 to 5 carbon atoms, a cyano group, an alkyl group having 1 to 10 carbon atoms, and an aryl group having 6 to 12 carbon atoms.

$Z^2$ in Formula (I-C) denotes a divalent linking group having a heteroatom at both ends; the heteroatom is preferably an oxygen atom, and the linking group is preferably an alkylene group, arylene group, or combination thereof bonded via a group or bond selected from the group consisting of a single bond, an ether bond, a thioether bond, a carboxylic acid ester bond, an amide bond, a urethane bond, and a sulfonyl group. $Z^2$ is preferably a group formed only from hydrogen, carbon, and oxygen atoms.

Furthermore, $Z^2$ is preferably a group having no greater than 50 carbon atoms, more preferably having 2 to 50 carbon atoms, yet more preferably 6 to 44 carbon atoms, and particularly preferably 6 to 16 carbon atoms.

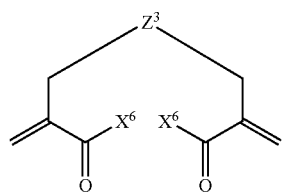

(I-D)

In Formula (I-D), the $X^6$s independently denote a monovalent organic residue bonded via a heteroatom, and $Z^3$ denotes a divalent linking group having a heteroatom at both ends.

$X^6$ in Formula (I-D) is preferably a monovalent organic residue bonded via an oxygen atom, is more preferably a straight-chain or branched alkoxy group having 1 to 10 carbon atoms, a straight-chain or branched substituted alkoxy group having 1 to 10 carbon atoms, an aryloxy group having 6 to 12 carbon atoms, or a substituted aryloxy group having 6 to 12 carbon atoms, and is yet more preferably an alkoxy group having 1 to 5 carbon atoms, or a substituted alkoxy group having 1 to 5 carbon atoms.

Preferred examples of the substituent in the substituted alkoxy group and substituted aryloxy group include a halogen atom (—F, —Br, —Cl, —I), a hydroxy group, an alkoxy group having 1 to 5 carbon atoms, an aryloxy group having 6 to 12 carbon atoms, an acyloxy group having 2 to 5 carbon atoms, a cyano group, an alkyl group having 1 to 5 carbon atoms, and an aryl group having 6 to 12 carbon atoms.

$Z^3$ in Formula (I-D) denotes a divalent linking group having a heteroatom at both ends; the heteroatom at both ends is preferably an oxygen atom, a nitrogen atom, or a sulfur atom, and the divalent linking group is preferably an alkylene group, arylene group, or combination thereof containing a group or a bond selected from the group consisting of a single bond, a thioether bond, a carboxylic acid ester bond, an amide bond, a urethane bond, and a sulfonato group (—OSO$_2$—). Furthermore, $Z^3$ is preferably a group formed only from hydrogen, carbon, and oxygen atoms.

Moreover, $Z^3$ is preferably a group having no greater than 50 carbon atoms, more preferably having 2 to 50 carbon atoms, yet more preferably 6 to 44 carbon atoms, and particularly preferably 6 to 16 carbon atoms.

Among the compounds represented by Formula (I), the polyfunctional type compound iii) is preferably a compound represented by Formula (I-E) or Formula (I-F) below.

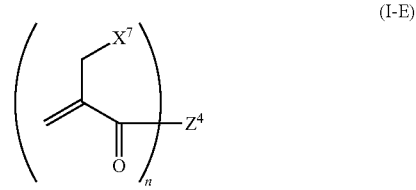

(I-E)

In Formula (I-E), the $X^7$s independently denote an hydrogen atom or monovalent organic residue bonded via an oxygen atom, or a halogen atom, $Z^4$ denotes a tri- or higher-valent linking group bonded to the carbonyl group via a heteroatom, and n denotes an integer of 3 or greater.

In Formula (I-E), the 3 or more $X^7$s may be identical to or different from each other, but it is preferable for them to be all the same.

The $X^7$s are independently preferably a hydrogen atom or monovalent organic residue bonded via an oxygen atom, a nitrogen atom, or a sulfur atom, or a halogen atom, are more preferably a hydroxy group, a straight-chain or branched alkoxy group having 1 to 10 carbon atoms, a straight-chain or branched substituted alkoxy group having 1 to 10 carbon atoms, an aryloxy group having 6 to 12 carbon atoms, a substituted aryloxy group having 6 to 12 carbon atoms, an acyloxy group having 2 to 10 carbon atoms, or a substituted acyloxy group having 2 to 10 carbon atoms, and yet more preferably an acyloxy group having 2 to 5 carbon atoms.

Preferred examples of the substituent in the substituted alkoxy group, the substituted aryloxy group, and the substituted acyloxy group include a halogen atom (—F, —Br, —Cl, —I), a hydroxy group, an alkoxy group having 1 to 5 carbon atoms, an aryloxy group having 6 to 12 carbon atoms, an acyloxy group having 2 to 5 carbon atoms, a cyano group, a straight-chain or branched alkyl group having 1 to 5 carbon atoms, and an aryl group having 6 to 12 carbon atoms.

It is preferable for n in Formula (I-E) to be an integer of 3 to 10, and more preferably an integer of 3 to 6.

$Z^4$ in Formula (I-E) is preferably a tri- or higher-valent linking group bonded to the carbonyl group via an oxygen atom, and more preferably a trivalent to hexavalent linking group bonded to the carbonyl group via an oxygen atom. Furthermore, $Z^4$ is preferably a group formed only from hydrogen, carbon, and oxygen atoms.

Moreover, $Z^4$ is preferably (E-Z-1) to (E-Z-14) shown below.

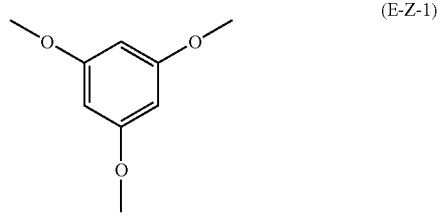

(E-Z-1)

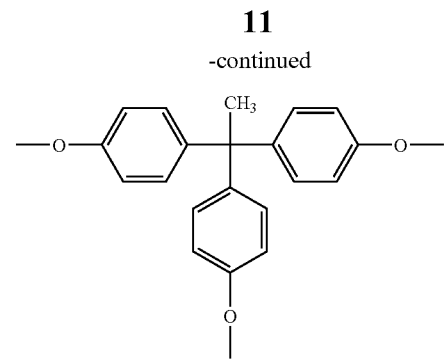 (E-Z-2)

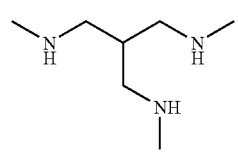 (E-Z-3)

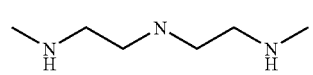 (E-Z-4)

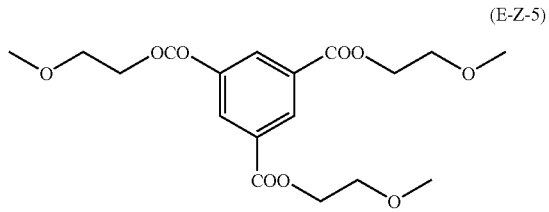 (E-Z-5)

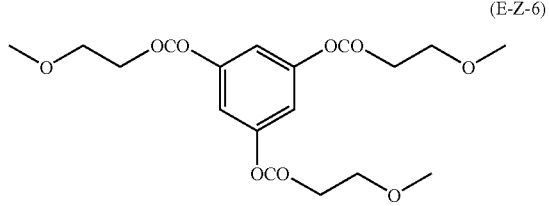 (E-Z-6)

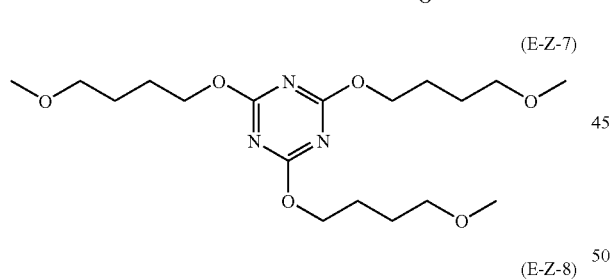 (E-Z-7)

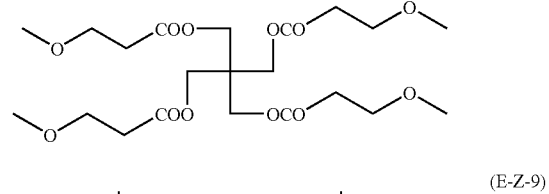 (E-Z-8)

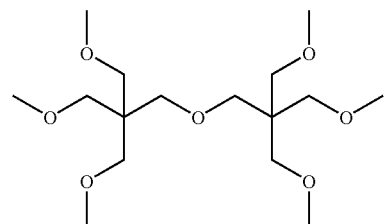 (E-Z-9)

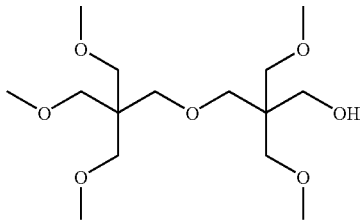 (E-Z-10)

 (E-Z-11)

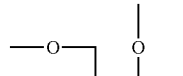 (E-Z-12)

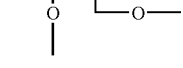 (E-Z-13)

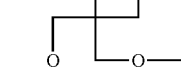 (E-Z-14)

Among them, $Z^4$ is preferably a group formed only from hydrogen, carbon, and oxygen atoms, and is more preferably (E-Z-10).

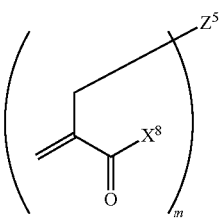 (I-F)

In Formula (I-F), the $X^8$s independently preferably denote a hydrogen atom or monovalent organic residue bonded via an oxygen atom or a nitrogen atom, $Z^5$ denotes a tri- or higher-valent linking group bonded to $X^8COC(=CH_2)CH_2$— via a heteroatom, and m denotes an integer of 3 or greater.

In Formula (I-F), the 3 or more $X^8$s may be identical to or different from each other, but it is preferable for them to be all the same.

The $X^8$s in Formula (I-F) are independently a monovalent organic residue bonded via an oxygen atom, are more preferably a straight-chain or branched alkoxy group having 1 to 15 carbon atoms, a straight-chain or branched substituted alkoxy group having 1 to 15 carbon atoms, an aryloxy group having 6 to 12 carbon atoms, or a substituted aryloxy group having 6 to 15 carbon atoms, and yet more preferably a straight-chain or branched alkoxy group having 1 to 12 carbon atoms or a straight-chain or branched substituted alkoxy group having 1 to 12 carbon atoms.

Preferred examples of the substituent in the substituted alkoxy group, the substituted aryloxy group, and the substituted acyloxy group include a halogen atom (—F, —Br, —Cl, —I), a hydroxy group, an alkoxy group having 1 to 5 carbon atoms, an aryloxy group having 6 to 12 carbon atoms, an acyloxy group having 2 to 5 carbon atoms, a cyano group, an alkyl group having 1 to 5 carbon atoms, and an aryl group having 6 to 12 carbon atoms.

It is preferable for m in Formula (I-F) to be an integer of 3 to 10, and more preferably an integer of 3 to 6.

$Z^5$ in Formula (I-F) is preferably a tri- or higher-valent linking group bonded to $X^8COC(=CH_2)CH_2$— via an oxygen atom, and more preferably a trivalent to hexavalent linking group bonded to $X^8COC(=CH_2)CH_2$— via an oxygen atom. Furthermore, $Z^5$ is preferably a group formed only from hydrogen, carbon, and oxygen atoms.

Moreover, $Z^5$ is preferably (F-Z-1) to (F-Z-9) shown below.

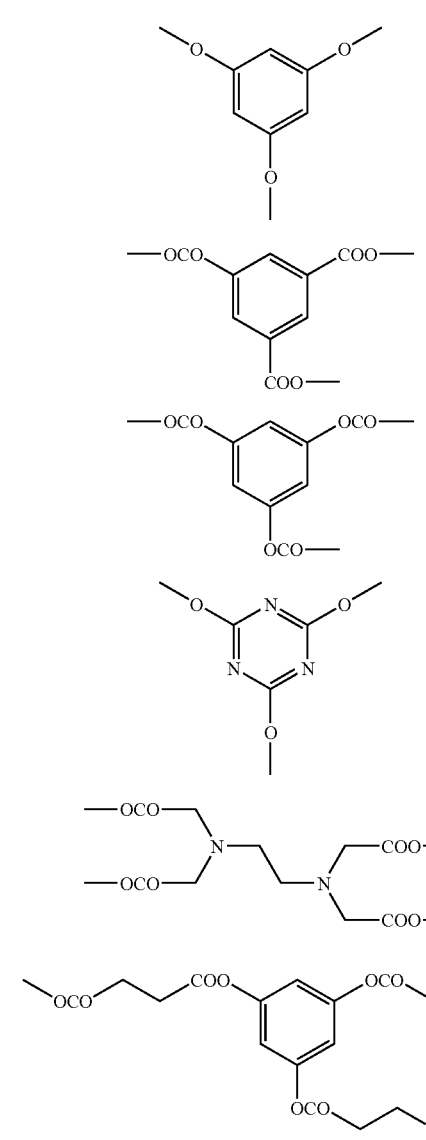

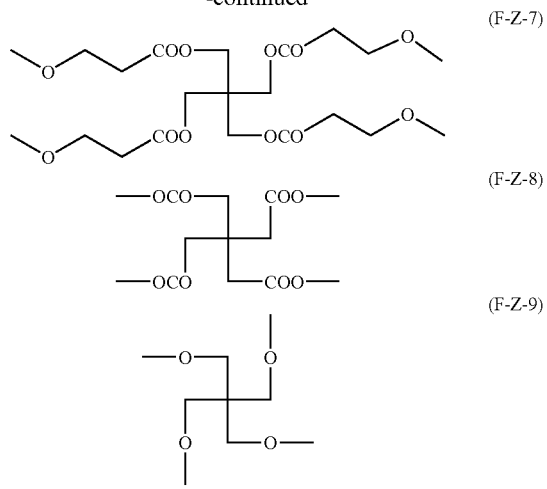

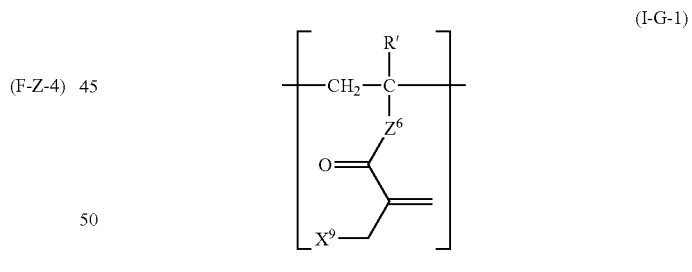

Among them, $Z^5$ is preferably a group formed only from hydrogen, carbon, and oxygen atoms, and more preferably (F-Z-2).

Among the compounds represented by Formula (I), the polymer type compound iv) is preferably a compound having at least a structural unit selected from the group consisting of Formula (I-G-1), Formula (I-G-2), Formula (I-G-3), and Formula (I-G-4) shown below, and more preferably a compound having at least 50 wt % of a structural unit selected from the group consisting of Formula (I-G-1), Formula (I-G-2), Formula (I-G-3), and Formula (I-G-4).

Furthermore, the polymer type compound iv) may have a single type of structural unit represented by Formula (I-G-1) to (I-G-4) shown below or may have two or more types thereof, and with regard to one structural unit shown below (e.g. a structural unit represented by Formula (I-G-1)) there may be a single type on its own or may have two or more types thereof.

$$\left[ \begin{array}{c} R' \\ -CH_2-C- \\ | \\ Z^6 \\ | \\ O=C \\ | \\ X^9 \end{array} \right]$$ (I-G-1)

In Formula (I-G-1), $X^9$ denotes a hydrogen atom or monovalent organic residue bonded via a heteroatom, or a halogen atom, $Z^6$ denotes a divalent linking group, and R' denotes a hydrogen atom or a methyl group.

In the polymer type compound, when there are two or more $X^9$s, $Z^6$s, and R's, they may be identical to or different from each other, but it is preferably a compound having only one type of structural unit represented by Formula (I-G-1).

$X^9$ in Formula (I-G-1) is preferably a hydrogen atom or monovalent organic residue bonded via an oxygen atom, a nitrogen atom, or a sulfur atom, or a halogen atom, and the organic residue is preferably an acyloxy group having 2 to 5 carbon atoms or a heterocyclic group bonded via a heteroatom.

$Z^6$ in Formula (I-G-1) is preferably a group formed only from hydrogen, carbon, and oxygen atoms, is more preferably a group or bond selected from the group consisting of an alkylene group, an arylene group, a carbonyl group, an ether bond, and a carboxylic acid ester bond, or a group in which two or more of these groups or bonds are linked, and is yet more preferably an ether bond, —CO$_2$CH$_2$CH$_2$O—, or —C$_6$H$_4$O—.

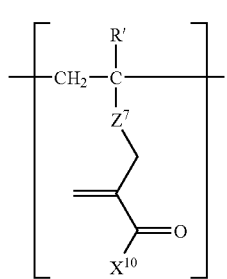
(I-G-2)

In Formula (I-G-2), $X^{10}$ denotes a monovalent organic residue bonded via a heteroatom, $Z^7$ denotes a divalent linking group, and R' denotes a hydrogen atom or a methyl group.

In the polymer type compound, when there are 2 or more $X^{10}$s, $Z^7$s, and R's, they may be identical to or different from each other, but it is preferably a compound having only one type of structural unit represented by Formula (I-G-2).

$X^{10}$ in Formula (I-G-2) is preferably a monovalent organic residue bonded via an oxygen atom, and is more preferably an alkoxy group having 1 to 6 carbon atoms or a substituted alkoxy group having 1 to 15 carbon atoms.

Preferred examples of the substituent in the substituted alkoxy group include a halogen atom (—F, —Br, —Cl, —I), a hydroxy group, an alkoxy group having 1 to 3 carbons, an aryloxy group having 6 to 12 carbon atoms, an acyloxy group having 2 to 5 carbon atoms, a cyano group, an alkyl group having 1 to 6 carbon atoms, and an aryl group having 6 to 12 carbon atoms.

$Z^7$ in Formula (I-G-2) is preferably a group formed only from hydrogen, carbon, and oxygen atoms, is more preferably a group or bond selected from the group consisting of an alkylene group, an arylene group, a carbonyl group, an ether bond, and a carboxylic acid ester bond, or a group in which two or more of these groups or bonds are linked, and is yet more preferably —COO—, —C$_6$H$_4$O—, or —C$_6$H$_4$OCOCH$_2$CH$_2$COO—.

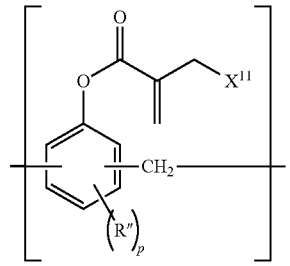
(I-G-3)

$X^{11}$ in Formula (I-G-3) denotes a hydrogen atom or monovalent organic residue bonded via a heteroatom, or a halogen atom, R" denotes a methyl group, and p denotes 0 or 1. Each group on the benzene ring may be bonded to any position of the benzene ring.

In the polymer type compound, when there are 2 or more $X^{11}$s, they may be identical to or different from each other, but it is preferably a compound having only one type of structural unit represented by Formula (I-G-3).

$X^{11}$ in Formula (I-G-3) is preferably a hydrogen atom or monovalent organic residue bonded via an oxygen atom, a nitrogen atom, or a sulfur atom, or a halogen atom, and is more preferably (G-X-1) or (G-X-2) shown below.

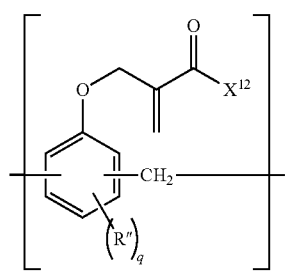
(G-X-1)

(G-X-2)

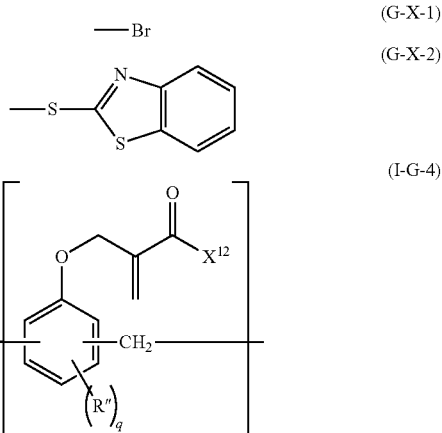
(I-G-4)

$X^{12}$ in Formula (I-G-4) denotes a monovalent organic residue bonded via a heteroatom, R" denotes a methyl group, and q denotes 0 or 1. Each group on the benzene ring may be bonded to any position of the benzene ring.

In the polymer type compound, when there are 2 or more $X^{12}$s, they may be identical to or different from each other, but it is preferably a compound having only one type of structural unit represented by Formula (I-G-4).

$X^{12}$ in Formula (I-G-4) is preferably a monovalent organic residue bonded via an oxygen atom, and is more preferably an alkoxy group having 1 to 6 carbon atoms or a substituted alkoxy group having 1 to 15 carbon atoms.

Preferred examples of the substituent in the substituted alkoxy group include a halogen atom (—F, —Br, —Cl, —I), a hydroxy group, an alkoxy group having 1 to 5 carbon atoms, an aryloxy group having 6 to 12 carbon atoms, an acyloxy group having 2 to 5 carbon atoms, a cyano group, an alkyl group having 1 to 6 carbon atoms, and an aryl group having 6 to 12 carbon atoms.

When the polymer type compound iv) has a structural unit represented by Formula (I-G-1) and/or Formula (I-G-2) above, a preferred example of a structural unit other than these is a structural unit represented by Formula (G-Y-1) below.

(G-Y-1)

In Formula (G-Y-1), $Y^1$ denotes a monovalent organic residue, and R' denotes a hydrogen atom or a methyl group.

Furthermore, the polymer type compound iv) may have a single type of structural unit represented by Formula (G-Y-1) or may have two or more types thereof.

Y¹ in Formula (G-Y-1) is preferably a carboxy group, an acyloxy group having 2 to 5 carbon atoms, or a substituted aryl group having 6 to 12 carbon atoms, and is more preferably —COOH, —OCOCH$_3$, or —C$_6$H$_4$OH.

When the polymer type compound iv) has a structural unit represented by Formula (I-G-3) and/or Formula (I-G-4) above, a preferred example of a structural unit other than these is a structural unit represented by Formula (G-Y-2) below.

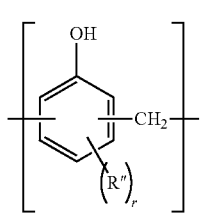

(G-Y-2)

In Formula (G-Y-2), R″ denotes a methyl group, and r denotes 0 or 1. Furthermore, each group on the benzene ring may be bonded to any position on the benzene ring.

Furthermore, the polymer type compound iv) may have a single type of structural unit represented by Formula (G-Y-2) or may have two or more types thereof.

Compound examples of the compounds represented by Formula (I) are shown below in the order in which they are explained above, that is, the monofunctional type i), the difunctional type ii), the polyfunctional type iii), and the polymer type iv).

Other than the specific examples shown below, there are specific examples described in paragraphs 0043 to 0066 of JP-A-2001-92127 and paragraphs 0043 to 0051 of JP-A-2002-105128.

i) Monofunctional Type

TABLE 1

(Group A)

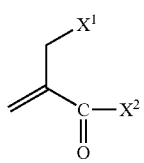

| No. | X¹ | X² |
|---|---|---|
| A-1 | OH | OCH$_3$ |
| A-2 | OH | O(n)C$_4$H$_9$ |
| A-3 | OH | O(n)C$_{12}$H$_{26}$ |
| A-4 | OH | 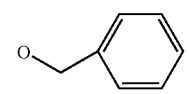 |
| A-5 | OH | 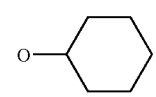 |
| A-6 | OH | 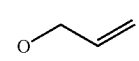 |

TABLE 1-continued (Group A)

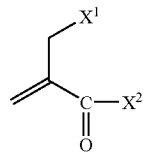

| No. | X¹ | X² |
|---|---|---|
| A-7 | OH | 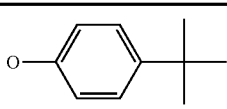 |
| A-8 | OCH$_3$ | OC$_2$H$_5$ |
| A-9 | 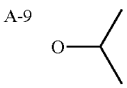 | O(n)C$_4$H$_9$ |
| A-10 | O(n)C$_8$H$_{17}$ | OCH$_3$ |
| A-11 | 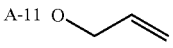 |  |
| A-12 |  | OCH$_3$ |
| A-13 |  | OCH$_3$ |
| A-14 | 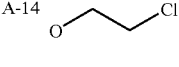 | OCH$_3$ |
| A-15 | 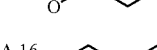 | OC$_2$H$_5$ |
| A-16 |  | OC$_2$H$_5$ |
| A-17 | OCOCH$_3$ | OCH$_3$ |
| A-18 | OCO(n)C$_6$H$_{13}$ | OCH$_3$ |
| A-19 |  | OCH$_3$ |
| A-20 | OSO$_2$CH$_3$ | OCH$_3$ |
| A-21 | OSO$_2$(n)C$_4$H$_9$ | OCH$_3$ |
| A-22 |  | OCH$_3$ |
| A-23 | OSO$_2$CF$_3$ | OC$_2$H$_5$ |
| A-24 | SCH$_3$ | OC$_2$H$_5$ |
| A-25 | S(n)C$_4$H$_9$ | OC$_2$H$_5$ |
| A-26 |  | OC$_2$H$_5$ |
| A-27 | 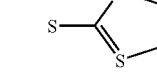 | OCH$_3$ |

TABLE 1-continued
(Group A)
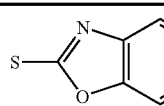
| No. | X¹ | X² |
|---|---|---|
| A-28 | 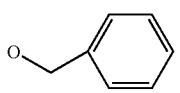 | OCH₃ |
| A-29 | F | O(n)C₁₂H₂₅ |
| A-30 | F | 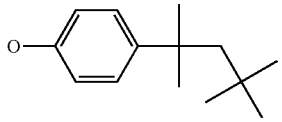 |
| A-31 | Cl | OCH₃ |
| A-32 | Cl | 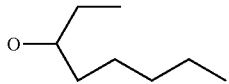 |
| A-33 | Br | O(n)C₄H₉ |
| A-34 | Br | 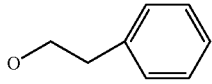 |
| A-35 | I | O(n)C₄H₉ |
| A-36 | I |  |
| A-37 |  | OC₂H₅ |
| A-38 |  | OC₂H₅ |
| A-39 |  | OC₂H₅ |
| A-40 | 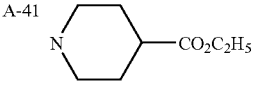 | OC₂H₅ |
| A-41 | 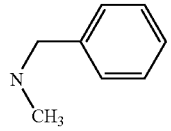 | OC₂H₅ |
| A-42 | 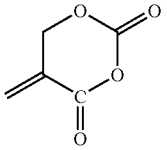 | OC₂H₅ |
TABLE 2
(Group B)
| | |
|---|---|
| B-1 | 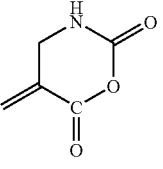 |
| B-2 | 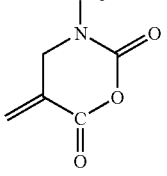 |
| B-3 | 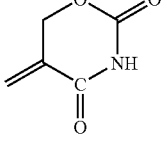 |
| B-4 | 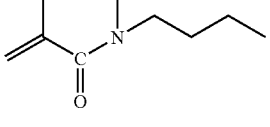 |
| B-5 | 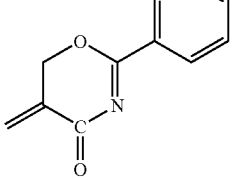 |
| B-6 | 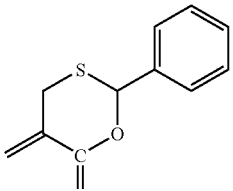 |
| B-7 | 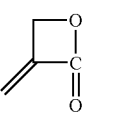 |
| B-8 | 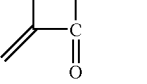 |
| B-9 |  | ii) Difunctional Type

TABLE 3

(Group C)

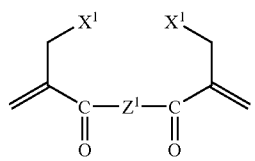

| No. | X¹ | Z¹ |
|---|---|---|
| C-1 | OH | O~~~~~O (pentylene dioxy) |
| C-2 | OH | O~~~~~~~~~~O (longer alkylene dioxy) |
| C-3 | OCOCH₃ | O~O~O~O (diethylene glycol type) |
| C-4 | OCOCH₃ | O(CH₂CH₂O)₂₁ (平均数) |
| C-5 | OH | O-CH₂-C₆H₄-CH₂-O (p-xylylene) |
| C-6 | OH | O-C₆H₄-O (p-phenylene) |
| C-7 | OH | O-C₆H₄-C(CH₃)₂-C₆H₄-O (bisphenol A) |
| C-8 | OH | O-C₆H₄-O-C₆H₄-O |
| C-9 | OCH₃ | O-C₆H₄-S-C₆H₄-O |
| C-10 | OCH₂C₆H₅ | O-C₆H₄-SO₂-C₆H₄-O |
| C-11 | OCOC₂H₅ | 1,2-phenylene dioxy |
| C-12 | OCOC₂H₅ | 1,3-phenylene dioxy |
| C-13 | OH | OCH₂CH₂OC(O)(CH₂)₄C(O)OCH₂CH₂O |

TABLE 3-continued
(Group C)
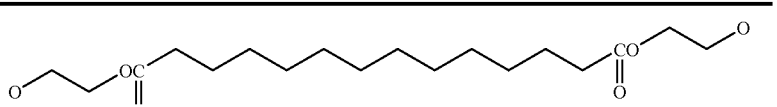
| No. | X¹ | Z¹ |
|---|---|---|
| C-14 | OCOCH₃ | 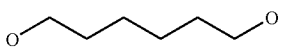 |
TABLE 4
(Group D)
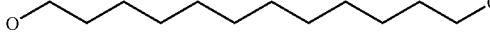
| No. | X² | Z² |
|---|---|---|
| D-1 | OCH₃ | 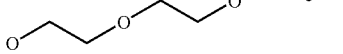 |
| D-2 | OCH₃ | 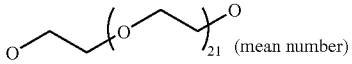 |
| D-3 | OC₂H₅ | 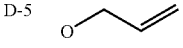 |
| D-4 | OC₂H₅ | 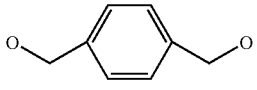 (mean number 21) |
| D-5 | 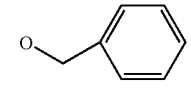 | 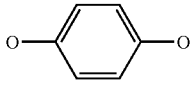 |
| D-6 | 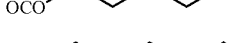 |  |
| D-7 | OCH₃ | 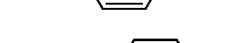 |
| D-8 | OCH₃ | 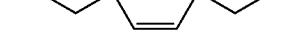 |
| D-9 | O(n)C₄H₉ | 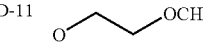 |
| D-10 | O(n)C₄H₉ |  |
| D-11 |  |  |

TABLE 4-continued (Group D)

a structure with $Z^2$ bridging two methacrylate-like groups with $COX^2$ and $^2XOC$ substituents

| No. | $X^2$ | $Z^2$ |
|---|---|---|
| D-12 | -O-CH₂CH₂-N(CH₃)₂ | -OCONH-(CH₂)₆-NHCOO- |
| D-13 | OCH₃ | 1,3-phenylene bis-OCONH/NHCOO |
| D-14 | OCH₃ | -OCONH-C₆H₄-C(CH₃)₂-C₆H₄-NHCOO- |
| D-15 | OCH₃ | -OSO₂-(CH₂)₄-SO₂O- |
| D-16 | O(n)C₁₂H₂₅ | trimethylbenzene with -OSO₂- and -SO₂O- substituents |
| D-17 | OCH₃ | -OCO-(CH₂)₃-COO-(CH₂)₄-OCO-(CH₂)₃-COO- |
| D-18 | OCH₃ | -OCO-(CH₂)₄-CONH-(CH₂)₆-NHCO-(CH₂)₄-COO- |
| D-19 | OCH₃ | -OCO-CH₂CH₂-CO-(O-CH₂CH₂-OCO-C₆H₄-CO)₂₀-O-CH₂CH₂-OCO-CH₂CH₂-COO- (mean number) |
| D-20 | OC₂H₅ | -OCO-CH₂CH(CONH-(CH₂)₄-O-)- |
| D-21 | OCH₃ | -OCO-(CH₂)₄-O- |
| D-22 | SCH₃ | -OCO-(CH₂)₄-OCO- |
| D-23 | -S-C₆H₅ | -OCO-CH₂CH₂-OCO- |
| D-24 | 5-chloro-benzothiazol-2-yl-S- | -OCO-CH₂CH₂-OCO- |

TABLE 4-continued (Group D)

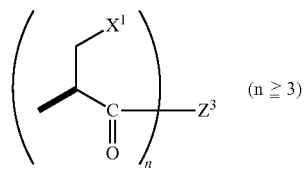

| No. | X² | Z² |
|---|---|---|
| D-25 | N(CH₃)(C₂H₅) | OCO~~~~OCO |
| D-26 | morpholino | OCO~~~~OCO |
| D-27 | NH(n)C₁₂H₂₅ | OCO~~~~~OCO |
| D-28 | OCH₃ | S~~~~~~S |
| D-29 | O-CH₂CH₂-OH | S~~~~~~S |
| D-30 | O~~~~OCOCH₃ | NHCO~~~~~~CONH | iii) Polyfunctional Group

TABLE 5

(Group E)

$$\left( \begin{array}{c} X^1 \\ | \\ CH_2 \\ | \\ C-CH_3 \\ \| \\ O \end{array} \right)_n Z^3 \quad (n \geq 3)$$

| No. | X¹ | Z³ |
|---|---|---|
| E-1 | OH | 1,3,5-trioxybenzene |
| E-2 | OCH₃ | tetrakis(4-hydroxyphenyl) derivative |
| E-3 | OCOCH₃ | pentaerythritol-type (C(CH₂O–)₃ with OCOCH₃) |

TABLE 5-continued
(Group E)
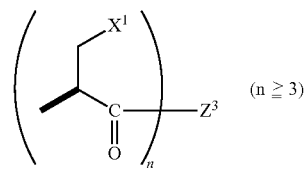
(n ≥ 3)
| No. | X¹ | Z³ |
|---|---|---|
| E-4 | OH | 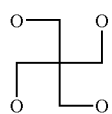 |
| E-5 | OCOCH₃ | 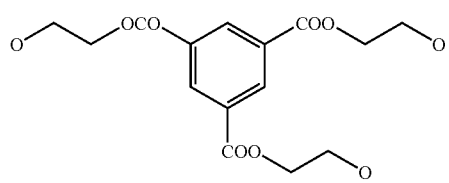 |
| E-6 | 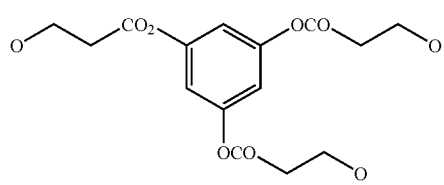 | 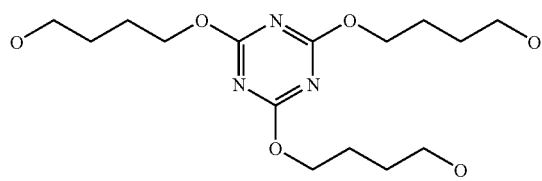 |
| E-7 | OH | 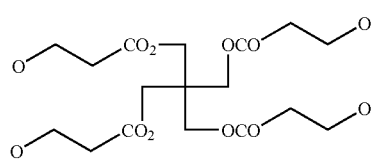 |
| E-8 | OH | 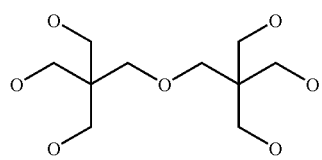 |
| E-9 | OH | 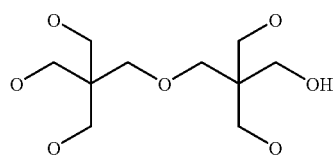 |
| E-10 | OCOCH₃ | 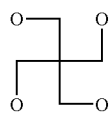 |
| E-11 | SCH₃ | 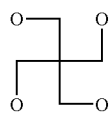 |

TABLE 5-continued
(Group E)
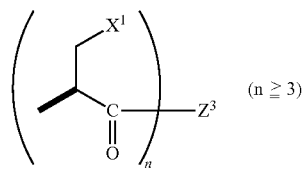
(n ≧ 3)
| No. | X¹ | Z³ |
|---|---|---|
| E-12 | Cl | 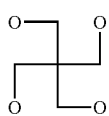 |
| E-13 | Br | 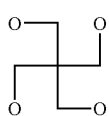 |
| E-14 | 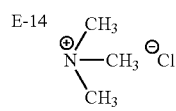 | 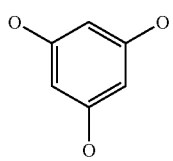 |
| E-15 | 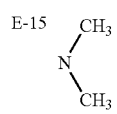 | 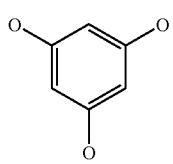 |
| E-16 | 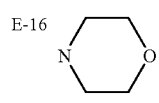 | 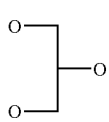 |
| E-17 | OCO(n)C$_{12}$H$_{25}$ | 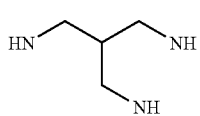 |
| E-18 | 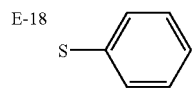 | 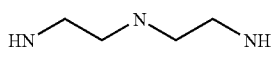 |
| E-19 | 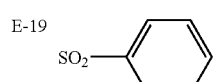 | 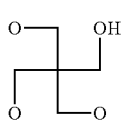 |
| E-20 | 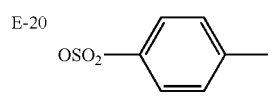 | 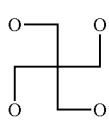 |
| E-21 | NHCOCH$_3$ | 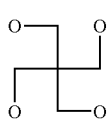 |

TABLE 5-continued
(Group E)
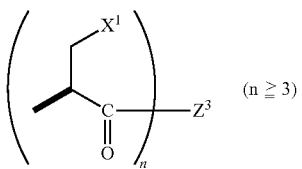
| No. | X¹ | Z³ |
|---|---|---|
| E-22 | 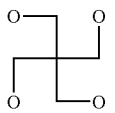 NHSO₂—⟨phenylene⟩— | 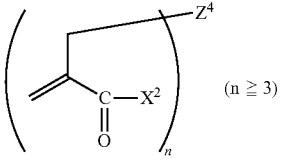 |
TABLE 6
(Group F)
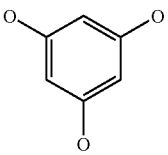
| No. | X² | Z⁴ |
|---|---|---|
| F-1 | OH | 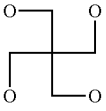 |
| F-2 | OCH₃ | 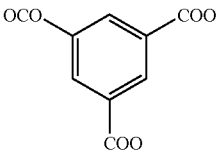 |
| F-3 | OCH₃ | 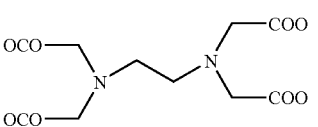 |
| F-4 | OCH₃ | 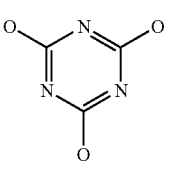 |
| F-5 | OC₂H₅ | |

TABLE 6-continued
(Group F)
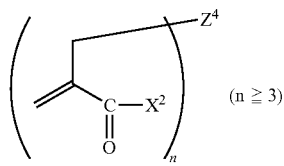
$(n \geqq 3)$
| No. | $X^2$ | $Z^4$ |
|---|---|---|
| F-6 | $OCH_3$ | (structure) |
| F-7 | $OCH_3$ | (structure) |
| F-8 | $O(n)C_3H_7$ | (structure) |
| F-9 | $N(CH_3)_2$ | (structure) |
| F-10 | $O(n)C_{12}H_{25}$ | (structure) |
iv) Polymer Type
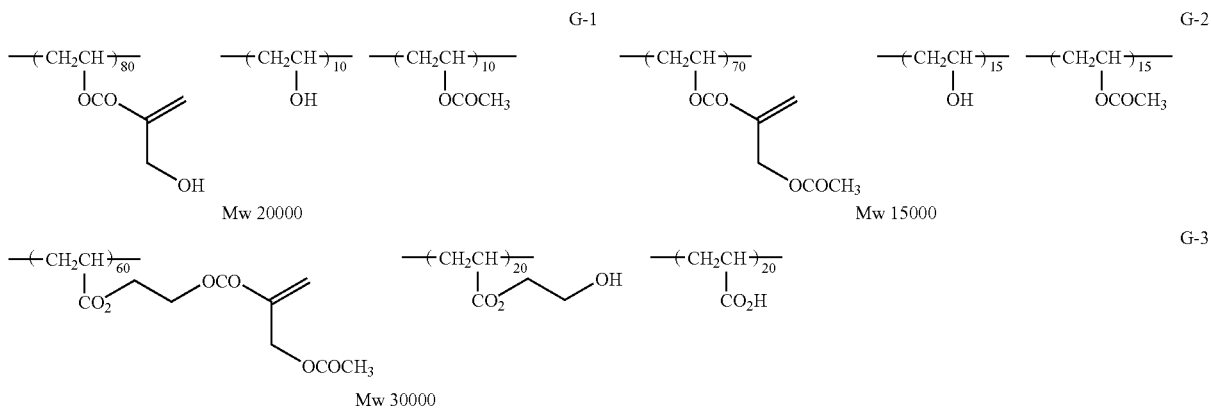

-continued
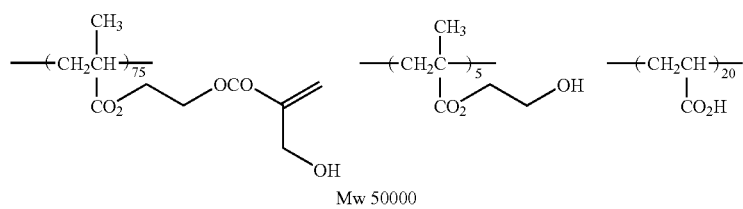
G-4
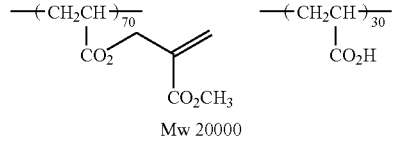
G-5
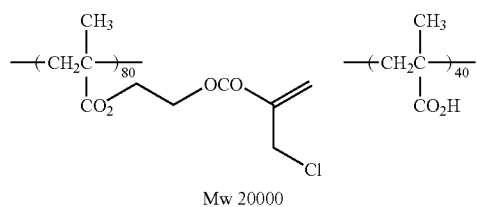
G-6 G-7 G-8
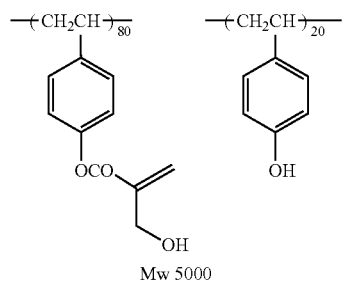
G-9 G-10
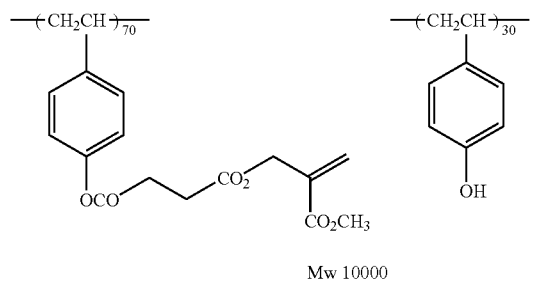
G-11 G-12
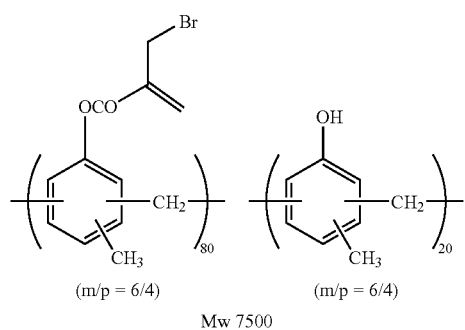 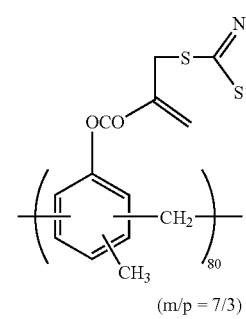
G-13 G-14

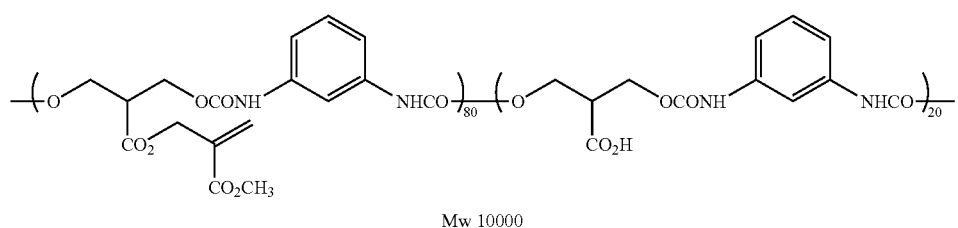
G-15
Mw 10000
i) Monofunctional Type
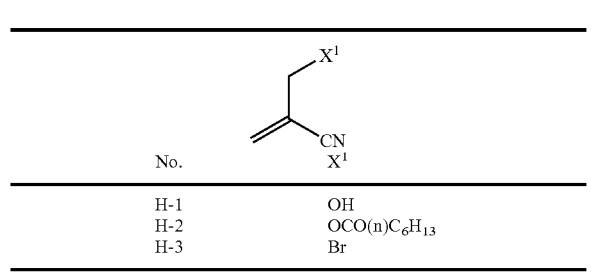
| No. | $X^1$ |
|---|---|
| H-1 | OH |
| H-2 | $OCO(n)C_6H_{13}$ |
| H-3 | Br |
ii) Difunctional Type
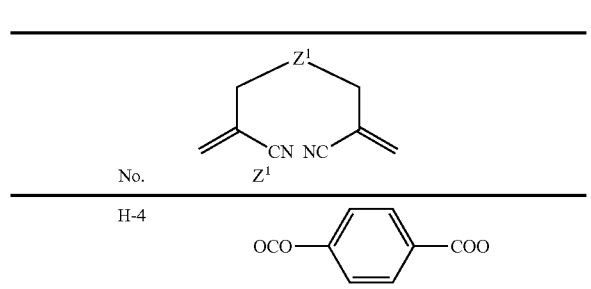
| No. | $Z^1$ |
|---|---|
| H-4 | OCO—⬡—COO |
iii) Polyfunctional Type
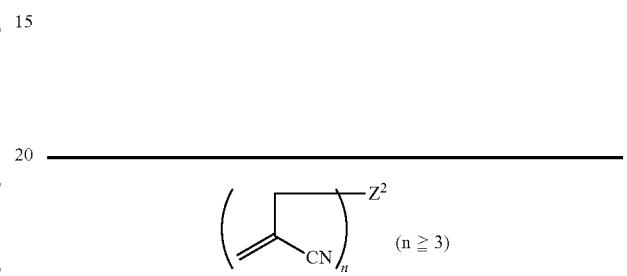
(n ≥ 3)
| No. | $Z^2$ |
|---|---|
| H-5 | 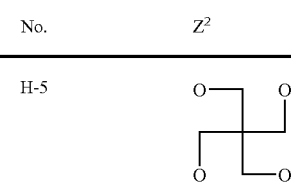 |
iv) Polymer Type
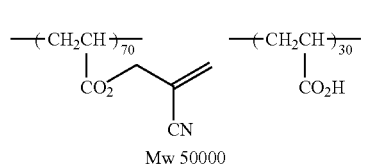
Mw 50000
H-6
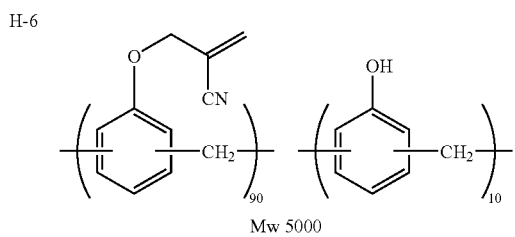
Mw 5000
H-7
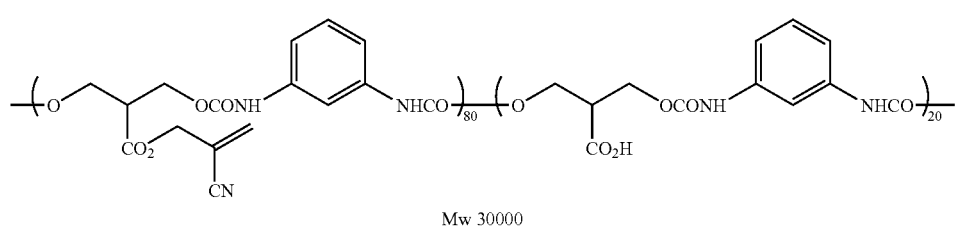
Mw 30000
H-8

(Group J)

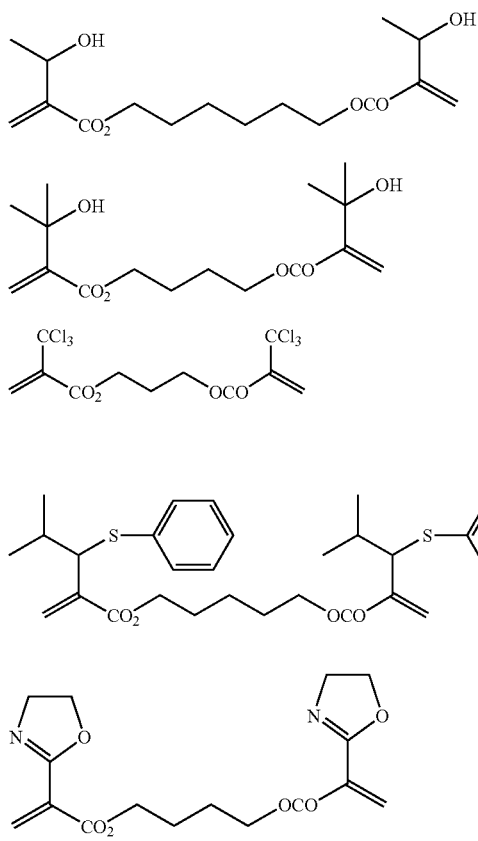
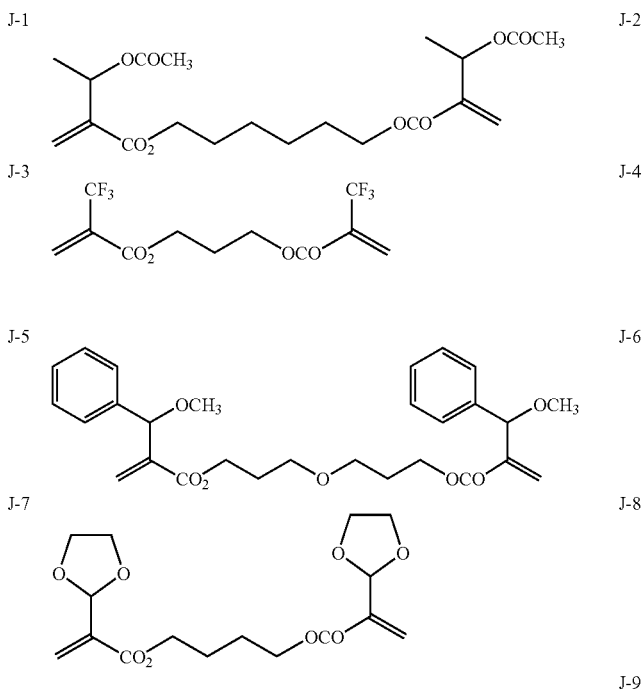

In the present invention, the compound represented by Formula (1) is preferably a monofunctional compound forming a cyclic structure (group B) or a di- or higher-functional polyfunctional compound (group C to group G).

In the present invention, the compound represented by Formula (I) is preferably at least one compound selected from the group consisting of A-15, A-28, B-1, C-13, D-3, D-17, D-29, E-10, F-3, G-5, G-9, and G-10, and among them it is preferably at least one compound selected from the group consisting of B-1, C-13, D-3, D-17, D-29, E-10, F-3, G-5, G-9, and G-10, which belong to the monofunctional compounds forming a cyclic structure (group B) and the di- or higher-functional polyfunctional compounds (group C to group G).

Furthermore, in the present invention, a mode in which two or more types of compound represented by Formula (1) are used in combination is also preferable. With regard to the mode for combined use, there is a mode in which compounds from the same group among group A to group G are used in combination, or a mode in which compounds from at least two different groups are used in combination, and the mode in which compounds from at least two different groups are used in combination is preferable. A mode in which at least one compound selected from the monofunctional compound groups (group A and group B) and at least one compound selected from the di- or higher-functional polyfunctional compound groups (group C to group G) are used in combination is more preferable. Furthermore, a mode in which at least two di- or higher-functional polyfunctional compound groups (group C to group G) are used in combination is also more preferable.

A method for producing the compound represented by Formula (I) is not particularly limited; it may be synthesized by a known method, and the following method can be cited as one example.

Among the compound examples listed above, with regard to A-1, A-12, A-17, A-22, A-27, A-38, B-5, C-1, D-7, E-4, F-3, G-5, and G-13, a synthetic met therefor is described in paragraphs 0322 to 0335 of JP-A-2001-92127. The other compound examples may be synthesized in accordance with the above synthetic method. Furthermore, with regard to compound examples H-1, H-2, H-3, H-4, and H-5, a synthetic method therefor is described in paragraphs 0178 to 0182 of JP-A-2002-105128. The other compound examples may be synthesized in accordance with the above synthetic method.

Curing Reaction

As described in the 'Description of the Related Art' section, the reason why a compound exhibiting high sensitivity curing properties with a low energy electron beam has a restriction in terms of its chemical structure is surmised to be as follows. That is, when taking into consideration the mechanism of polymerization with an electron beam, it is a two stage initiation mechanism in which a high energy electron emitted from an electron beam irradiation device collides with a large amount of polymerizable compound contained in a curable composition to thus generate a secondary electron, and polymerization is initiated by this secondary electron. Furthermore, a compound that efficiently generates a secondary electron is an electron-rich compound containing oxygen, such as an ethylene oxide chain or a hydroxy group; when a low energy electron beam is used, it is necessary for the structure of a polymerizable compound, such as a monomer, oligomer, polymer, etc. having an acrylic acid ester group, an acrylamide group, an methacrylic acid ester group, a methacrylamide group, etc., which are conventionally used as general high sensitivity polymerizable compounds, to contain the ethylene oxide chain, etc. mentioned above, and there are currently problems in terms of coating physical properties and function being exhibited.

In the electron beam-curable composition of the present invention, a polymerizable compound having an α-heteroatom substituted methylacryloyl group or an α-heteroatom substituted methylacrylonitrile compound represented by Formula (I) is particularly good in electron beam curing, and although the reason therefor is not clear, it can be surmised to be as follows.

With regard to the polymerizable compound having an α-heteroatom substituted methylacryloyl group or the a-heteroatom substituted methylacrylonitrile compound, it is known that, unlike an itaconic acid group or an α-alkylacryloyl group, which have a substituent at the same α-position but have low polymerizability, the polymerizability improves due to the electronic and steric effects of a heteroatom substituted on the α-carbon atom of the ethylenically unsaturated double bond, and the polymerizability is comparable to that of an acrylic compound. Moreover, it is known that, by the use of a combination of the compound having an α-heteroatom substituted methylacryloyl group or the α-heteroatom substituted methyl acrylonitrile compound with a photoinitiator, the effect of inhibition of polymerization by oxygen can be greatly suppressed and a photopolymerizable composition with high sensitivity and good storage stability can be obtained because reaction of a chain growth end with oxygen is difficult due to polymerization growth rate constant, termination rate constant, and matching with an initiator, but the effectiveness toward electron beam curing, which is different from light in terms of required performance and polymerization initiation mechanism, is not known.

Although the polymerization mechanism of the compound having an α-hetero substituted methylacryloyl group or the α-heteroatom substituted methyl acrylonitrile compound in electron beam curing is not clear, it is surmised that due to the effect of the α-heteroatom directly bonded to the α-position of the polymerizable group, a secondary electron is generated in the immediate vicinity of the polymerizable group.

As a result, with regard to an acryloyl group or a methacryloyl group, which have high polymerizability but can link to only one type of substituent, since the above-mentioned structure for generating a secondary electron is substituted, it becomes difficult for a functional group to be substituted, but with regard to the above polymerizable group, since there is an acrylic moiety ($Q^1$ and the ethylenically unsaturated double bond in Formula (I)), which is linked to another functional group in addition to the α-hetero substituted moiety ($X^1$ in Formula (I)), various types of functional substituents can be linked to without any structural restriction, and it is anticipated that the problem with structural restriction in electron beam curing (higher sensitivity in polymerization during electron beam curing) can thus be solved.

The curable composition of the present invention may comprise a polymerizable compound other than the compound represented by Formula (I). Examples of the other polymerizable compound include known polymerizable compounds such as acrylic acid esters, normal methacrylic acid esters having no heteroatom on the α-carbon atom of the ethylenically unsaturated double bond, acrylamides, normal methacrylamides having no heteroatom on the α-carbon atom of the ethylenically unsaturated double bond, vinyl esters, aromatic group-containing ethylenically unsaturated compounds such as styrene, acrylonitriles, (meth)acrylamides having no heteroatom on the α-carbon atom of the ethylenically unsaturated double bond, maleic anhydride, and maleimide. Specific examples thereof include polymerizable compounds described in paragraphs 0051 to 0056 of JP-A-2002-107927.

The content of the compound represented by Formula (I) is preferably at least 10 wt % relative to the weight of all the components of the electron beam-curable composition, more preferably at least 20 wt %, yet more preferably at least 50 wt %, and particularly preferably at least 80 wt %.

When the content is in the above-mentioned range, an electron beam-curable composition having excellent storage stability and high sensitivity can be obtained, and when it is cured, a cured coating having excellent adhesion can be obtained.

Coloring Agent

The electron beam-curable composition of the present invention may comprise a coloring agent as necessary.

The coloring agent that can be used in the present invention is not particularly limited, but a pigment and an oil-soluble dye that have excellent weather resistance and rich color reproduction are preferable, and it may be selected from any known coloring agent such as a soluble dye.

It is preferable that the colorant that can be suitably used in the electron beam-curable composition of the present invention does not function as a polymerization inhibitor in a polymerization reaction, which is a curing reaction. This is because the sensitivity of the curing reaction by electron beam should not be degraded.

Pigment

The pigment that can be used in the present invention is not particularly limited and, for example, organic and inorganic pigments having the numbers below described in the Color Index may be used.

That is, as a red or magenta pigment, Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36;

as a blue or cyan pigment, Pigment Blue 1, 15, 15:1, 15:2, 15:3, 15:4, 15:6, 16, 17-1, 22, 27, 28, 29, 36, or 60;

as a green pigment, Pigment Green 7, 26, 36, or 50;

as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193;

as a black pigment, Pigment Black 7, 28, or 26;

as a white pigment, Pigment White 6, 18, or 21, etc. may be used according to the intended application.

Oil-soluble Dye

The oil-soluble dye that can be used in the present invention is explained below.

The oil-soluble dye that can be used in the present invention means a dye that is substantially insoluble in water. Specifically, the solubility in water at 25° C. (the mass of dye that can be dissolved in 100 g of water) is no greater than 1 g, preferably no greater than 0.5 g, and more preferably no greater than 0.1 g. Therefore, the oil-soluble dye means a so-called water-insoluble pigment or an oil-soluble dye, and among these the oil-soluble dye is preferable.

Among the oil-soluble dyes that can be used in the present invention, as a yellow dye, any may be used. Examples thereof include aryl or heteryl azo dyes having a coupling component such as a phenol, a naphthol, an aniline, a pyrazolone, a pyridone, or an open-chain active methylene compound; azomethine dyes having a coupling component such as an open-chain active methylene compound; methine dyes such as benzylidene dyes and monomethineoxonol dyes; quinone dyes such as naphthoquinone dyes and anthraquinone dyes; and other dye species such as quinophthalone dyes, nitro/nitroso dyes, acridine dyes, and acridinone dyes.

Among the above-mentioned oil-soluble dyes that can be used in the present invention, as a magenta dye, any may be used. Examples thereof include aryl or heteryl azo dyes having a coupling component such as a phenol, a naphthol, or an aniline; azomethine dyes having a coupling component such as a pyrazolone or a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, or anthrapyridones; and condensed polycyclic dyes such as dioxazine dyes.

Among the oil-soluble dyes that can be used in the present invention, as a cyan dye, any may be used. Examples thereof include indoaniline dyes, indophenol dyes, and azomethine dyes having a coupling component such as a pyrrolotriazole; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having a coupling component such as a phenol, a naphthol, or an aniline; and indigo/thioindigo dyes.

The above-mentioned dyes may be dyes that exhibit respective colors of yellow, magenta, and cyan only after a part of the chromophore dissociates, and in that case the counter cation may be an inorganic cation such as an alkali metal or ammonium, may be an organic cation such as pyridinium or a quaternary ammonium salt, or may be a polymer cation having the above cation as a partial structure.

Although not limited to the following, preferred specific examples thereof include CI Solvent Black 3, 7, 27, 29, and 34; CI Solvent Yellow 14, 16, 19, 29, 30, 56, 82, 93, and 162; CI Solvent Red 1, 3, 8, 18, 24, 27, 43, 49, 51, 72, 73, 109, 122, 132, and 218; CI Solvent Violet 3; CI Solvent Blue 2, 11, 25, 35, 38, 67, and 70; CI Solvent Green 3 and 7; and CI Solvent Orange 2.

Particularly preferred examples thereof include Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Chemical Industries, Ltd.), Aizen Spilon Blue GNH (manufactured by Hodogaya Chemical Co., Ltd.), Neopen Yellow 075, Neopen Magenta SE1378, Neopen Blue 808, Neopen Blue FF4012, and Neopen Cyan FF4238 (manufactured by BASF).

In the present invention, the oil-soluble dye may be used singly or in a combination of two or more types.

Furthermore, another colorant such as a water-soluble dye, a disperse dye, or a pigment may be contained as necessary in a range that does not interfere with the effects of the present invention.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent.

Specific preferred examples of the disperse dye include Cl Disperse Yellow 5, 42, 54, 64, 79, 82, 83, 93, 99, 100, 119, 122, 124, 126, 160, 184:1, 186, 198, 199, 201, 204, 224, and 237; CI Disperse Orange 13, 29, 31:1, 33, 49, 54, 55, 66, 73, 118, 119, and 163; CI Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; Cl Disperse Violet 33; CI Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and CI Disperse Green 6:1 and 9.

The coloring agent that can be used in the present invention is preferably added to the electron beam-curable composition of the present invention and then dispersed in the electron beam-curable composition to an appropriate degree. For dispersion of the coloring agent, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

The coloring agent may be added directly to the electron beam-curable composition, but in order to improve dispersibility it may be added in advance to a solvent or a dispersing medium such as a polymerizable compound used in the present invention.

In the present invention, in order to avoid the problem of the solvent resistance being degraded when the solvent remains in the cured coating and the VOC (Volatile Organic Compound) problem of the residual solvent, it is preferable to add the coloring agent in advance to a dispersing medium such as a polymerizable compound. As a polymerizable compound used, it is preferable in terms of dispersion suitability to select a monomer having the lowest viscosity.

These colorants may be used by appropriately selecting one type or two or more types according to the intended purpose of the electron beam-curable composition.

When a colorant such as a pigment that is present as a solid in the electron beam-curable composition of the present invention is used, it is preferable for the colorant, the dispersant, the dispersing medium, dispersion conditions, and filtration conditions to be set so that the average particle size of colorant particles is preferably 0.005 to 0.5 µm, more preferably 0.01 to 0.45 µm, and yet more preferably 0.015 to 0.4 µm. By such control of particle size, the storage stability, the transparency, and the curing sensitivity of the electron beam-curable composition can be maintained.

The content of the colorant in the electron beam-curable composition of the present invention is appropriately selected according to the color and the intended purpose, and is generally preferably 0.01 to 30 wt % relative to the weight of the entire electron beam-curable composition.

Dispersant

It is preferable to add a dispersant when dispersing the colorant.

The type of dispersant is not particularly limited, but it is preferable to use a polymeric dispersant.

Examples of the polymeric dispersant include polymeric dispersants such as DisperBYK-101, DisperBYK-102, DisperBYK-103, DisperBYK-106, DisperBYK-111, DisperBYK-161, DisperBYK-162, DisperBYK-163, DisperBYK-164, DisperBYK-166, DisperBYK-167, DisperBYK-168, DisperBYK-170, DisperBYK-171, DisperBYK-174, and DisperBYK-182 (all manufactured by BYK Chemie), EFKA4010, EFKA4046, EFKA4080, EFKA5010, EFKA5207, EFKA5244, EFKA6745, EFKA6750, EFKA7414, EFKA7462, EFKA7500, EFKA7570, EFKA7575, and EFKA7580 (all manufactured by EFKA Additives), Disperse Aid 6, Disperse Aid 8, Disperse Aid 15, and Disperse Aid 9100 (manufactured by San Nopco Limited); various types of Solsperse dispersants such as Solsperse 3000, 5000, 9000, 12000, 13240, 13940, 17000, 24000, 26000, 28000, 32000, 36000, 39000, 41000, and 71000 (manufactured by Avecia); Adeka Pluronic L31, F38, L42, L44, L61, L64, F68, L72, P95, F77, P84, F87, P94, L101, P103, F108, L121, and P-123 (manufactured by Adeka Corporation), Isonet S-20 (manufactured by Sanyo Chemical Industries, Ltd.), and Disparlon KS-860, 873SN, and 874 (polymeric dispersant), #2150 (aliphatic poly carboxylic acid), and #7004 (polyether ester type) (manufactured by Kusumoto Chemicals, Ltd.).

It is also possible to use in combination a pigment derivative such as a phthalocyanine derivative (product name: EFKA-745 (manufactured by QEFKA)), or Solsperse 5000, 12000, or 22000 (manufactured by Avecia).

The content of the dispersant in the electron beam-curable composition of the present invention is appropriately selected according to the intended purpose, and is generally preferably 0.01 to 5 wt % relative to the weight of the entire electron beam-curable composition.

Surfactant

The electron beam-curable composition of the present invention may comprise a surfactant as necessary.

As the surfactant, those described in JP-A-62-173463 and 62-183457 can be cited. Examples thereof include anionic surfactants such as dialkylsulfosuccinic acid salts, alkylnaphthalene sulfonic acid salts, and fatty acid salts, nonionic surfactants such as polyoxyethylene alkyl ethers, polyoxyethylene alkyl aryl ethers, acetylene glycols, and polyoxyethylene/polyoxypropylene block copolymers, and cationic surfactants such as alkylamine salts and quaternary ammonium salts. An organofluoro compound may be used instead of the above-mentioned surfactant. The organofluoro compound is preferably hydrophobic. Examples of the organofluoro compound include fluorine-based surfactants, oil-like fluorine-based compounds (e.g. fluorine oil), solid fluorine compound resins (e.g. tetrafluoroethylene resin), and those described in JP-B-57-9053 (paragraphs 8 to 17) and JP-A-62-135826.

The content of the surfactant in the electron beam-curable composition of the present invention is appropriately selected according to the intended purpose and is generally preferably 0.0001 to 1 wt % relative to the weight of the entire electron beam-curable composition.

Other Component

The electron beam-curable composition of the present invention may comprise other component as necessary.

Examples of the other component include a sensitizing colorant, a cosensitizer, another polymerizable compound, a UV absorber, an antioxidant, an antifading agent, a solvent, a polymer compound, and a basic compound.

UV Absorber

A UV absorber may be used from the viewpoint of improving the weather resistance of a cured coating obtained and preventing discoloration.

The UV absorbers include benzotriazole compounds described in JP-A-58-185677, JP-A-61-190537, JP-A-2-782, JP-A-5-197075 and JP-A-9-34057; benzophenone compounds described in JP-A-46-2784, JP-A-5-194483 and U.S. Pat. No. 3,214,463; cinnamic acid compounds described in JP-B-48-30492, JP-B-56-21141 and JP-A-10-88106; triazine compounds described in JP-A-4-298503, JP-A-8-53427, JP-A-8-239368, JP-A-10-182621 and JP-W-8-501291 (the term "JP-W" as used herein means an unexamined published international patent application); compounds described in Research Disclosure No. 24239; and compounds represented by stilbene and benzoxazole compounds, which absorb ultraviolet rays to emit fluorescence, the so-called fluorescent brightening agents.

The amount thereof added is appropriately selected according to the intended application, and it is generally on the order of 0.5 to 15 wt % on the basis of the solids content in the electron beam-curable composition.

Antioxidant In order to improve the stability of the electron beam-curable composition, an antioxidant may be added. Examples of the antioxidant include those described in Laid-open European Patent Nos. 223739, 309401, 309402, 310551, 310552, and 459416, Laid-open German Patent No. 3435443, JP-A-54-48535, JP-A-62-262047, JP-A-63-113536, JP-A-63-163351, JP-A-2-262654, JP-A-2-71262, JP-A-3-121449, JP-A-5-61166, JP-A-5-119449, and U.S. Pat. Nos. 4,814,262 and 4,980,275.

The amount thereof added is appropriately selected according to the intended application, and it is preferably on the order of 0.1 to 8 wt % on the basis of the solids content in the electron beam-curable composition.

Antifading Agent

The electron beam-curable composition of the present invention may employ various organic and metal complex antifading agents. The organic antifading agents include hydroquinones, alkoxyphenols, dialkoxyphenols, phenols, anilines, amines, indanes, chromans, alkoxyanilines, and heterocycles, and the metal complex antifading agents include nickel complexes and zinc complexes. More specifically, there can be used compounds described in patents cited in Research Disclosure, No. 17643, Items VII-I to J, ibid., No.15162, ibid., No.18716, page 650, left-hand column, ibid., No. 36544, page 527, ibid., No. 307105, page 872, and ibid., No. 15162, and compounds contained in general formulae and compound examples of typical compounds described in JP-A-62-21572, pages 127 to 137.

The amount thereof added is appropriately selected according to the intended application, and it is preferably on the order of 0.1 to 8 wt % on the basis of the solids content in the electron beam-curable composition.

Solvent

It is also effective to add a trace amount of organic solvent to the electron beam-curable composition of the present invention in order to improve the adhesion to a recording medium.

Examples of the solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic-based solvents such as benzene and toluene, ester-based solvents such as ethyl acetate, butyl acetate, and isopropyl acetate, ether-based solvents such as diethyl ether, tetrahydrofuran, and dioxane, and glycol ether-based solvents such as ethylene glycol monomethyl ether and ethylene glycol dimethyl ether.

In this case, it is effective if the amount thereof added is in a range that does not cause problems with the solvent resistance or the VOC, and the amount is preferably in the range of 0.1 to 5 wt % relative to the total amount of the electron beam-curable composition, and more preferably 0.1 to 3 wt %.

High Molecular Weight Compound

The electron beam-curable composition may contain various types of high molecular weight compounds in order to adjust film physical properties.

Examples of the high molecular weight compounds include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinylic resins, acrylic resins, rubber-based resins, waxes, and other natural resins. They may be used in a combination of two or more types.

In addition to the above, the composition may contain as necessary, for example, a leveling additive, a matting agent, a wax for adjusting physical properties of the cured coating, or a tackifier in order to improve the adhesion to a substrate such as polyolefin or PET, the tackifier not inhibiting polymerization.

Specific examples of the tackifier include high molecular weight tacky polymers described on pp. 5 and 6 of JP-A-2001-49200 (e.g. a copolymer formed from an ester of (meth)acrylic acid and an alcohol having an alkyl group with 1 to 20 carbons, an ester of (meth)acrylic acid and an alicyclic alcohol having 3 to 14 carbons, or an ester of (meth)acrylic acid and an aromatic alcohol having 6 to 14 carbons), and a low molecular weight tackifying resin having a polymerizable unsaturated bond.

A Process for Producing a Cured Coating

A process for producing a cured coating in the present invention, the process comprising:

(Step 1) a step of forming on a substrate a layer of a curable composition comprising at least one compound represented by Formula (I); and (Step 2) a step of curing the layer of the curable composition by irradiating with an electron beam.

Step 1

The step of forming on a substrate a layer of a curable composition comprising at least one compound represented by Formula (I) is now explained.

Substrate

The substrate is not particularly limited, and examples thereof include metals such as aluminum, copper, silver, gold, iron, nickel, and tin, glass, ceramic, porcelain, natural rubber, silk, linen, animal fur, animal skin, and organic polymer substrates such as polyester, polyethylene terephthalate, polyethylene naphthalate, Tetron, nylon, a cellulose such as triacetylcellulose, silicone, polycarbonate, polyvinyl alcohol, polyurethane, polyurea, a polyolefin such as polyethylene, and a synthetic rubber such as styrene-butadiene. From the viewpoint of adhesion, an organic polymer substrate is preferable. An organic polymer substrate containing oxygen and/or nitrogen atoms is more preferable.

Organic Polymer Substrate

The organic polymer substrate may employ a known material; the type thereof is not particularly limited, and examples thereof include polyolefin, polyamide, polyester, polycarbonate, polystyrene, polyether, cellulose derivatives, polyimide, (meth)acrylic derivative polymers, heat-resistant elastomers, thermosetting polymers, polyenes, main chain mesh-form polymers, and copolymers of the above polymers.

Specific examples thereof include polyethylene and polypropylene as polyolefins; nylon-6, nylon-6,6, nylon-6,12, and aromatic polyamide as polyamides; polyethylene terephthalate, polybutylene terephthalate, and polyethylene naphthalate as polyesters; polycarbonate and polyester carbonate formed using a bisphenol A or diphenyl carbonate monomer as polycarbonates; polyoxymethylene, polyphenylene oxide, polyether sulfone, polyether ketone, polyphenylene sulfide, and polysulfone as polyethers; cellulose diacetate, cellulose triacetate, cellulose propionate, cellulose butyrate, cellulose acetate butyrate, and cellulose nitrate as cellulose derivatives; polymethyl(meth)acrylate, polyethyl(meth)acrylate, and polybutyl(meth)acrylate as (meth)acrylic derivative polymers; a silicone-based polymer, a fluorine-based polymer, and a nitrogen-phosphorus-based polymer as heat-resistant elastomers; a phenol resin and an epoxy resin as thermosetting polymers; polyacetylene, polydiacetylene, and polyazomethine as polyenes; poly(p-phenylene), polytriazine, polyparabanic acid, polyhydantoin, and polydistyrylpyrazine as main chain mesh-form polymers; and (meth)acrylonitrile-butadiene-styrene copolymer (ABS resin), ethylene-(meth)acrylic acid alkyl ester copolymer, and trioxane-ethylene oxide copolymer as copolymers of the above polymers.

In the case of a film-form organic polymer substrate, from the viewpoint of adhesion being excellent, polyamide, polyester, polycarbonate, cellulose derivatives, and polyimide are preferable, polyethylene terephthalate and cellulose triacetate film are more preferable, and polyethylene terephthalate is particularly preferable.

The organic polymer substrate may be subjected to a surface treatment before use. Examples of the surface treatment include a chemical treatment, a mechanical treatment, a corona discharge treatment, a flame treatment, a UV treatment, a high frequency treatment, a glow discharge treatment, an active plasma treatment, a laser treatment, a mixed acid treatment, and an ozone treatment. The surface treatment can improve adhesion by forming a polar group on the surface of a hydrophobic support, removing a thin layer that works against adhesion to the surface, or increasing the crosslink density of the surface.

The shape of the organic polymer substrate is not particularly limited; any shape such as film form, sheet form, card form, or block form may be used, and film form is preferable.

The film-form organic polymer substrate is preferably stretched monoaxially or biaxially, and from the viewpoint of mechanical strength a biaxially stretched substrate is more preferable. It may be produced as a composite of a plurality of materials, or as a laminate in which two or more layers of different types of resins are laminated.

The thickness of the film-form organic polymer substrate is preferably 15 to 500 µm, more preferably 15 to 200 µm, and yet more preferably 40 to 200 µm. When the thickness is in the above-mentioned range, it is advantageous in terms of ease of handling and general purpose use.

The film-form organic polymer substrate may be transparent or may contain a colorant described above. Furthermore, an additive may be added as necessary. Examples thereof include a UV absorber, a light stabilizer, a heat absorbing agent, an antistatic agent, and an antimicrobial agent.

In the present invention, a resin-coated paper in which paper, etc. is coated with an organic polymer resin may be used. Examples thereof include a paper having one side or both sides laminated with the above-mentioned polyester or polyolefin film.

It is also possible to use as a substrate read only optical disks such as CD-ROM and DVD-ROM, write-once optical disks such as CD-R and DVD-R, rewritable optical disks, etc.

Formation of Electron Beam-curable Layer

An electron beam-curable layer is formed by, for example, coating the surface of a moving organic polymer substrate film with the above-mentioned electron beam-curable composition to give a predetermined coating thickness.

A coater for applying the electron beam-curable composition may employ an air doctor coater, a blade coater, a rod coater, an extrusion coater, an air knife coater, a squeegee coater, a dip coater, a reverse coater, a transfer roll coater, a gravure coater, a kiss coater, a cast coater, a spray coater, a spin coater, etc. With regard to these, for example, 'Saishin Kotingu Gijutsu' (Latest Coating Technology) (May 31, 1983) published by Sogo Gijutsu Center can be referred to.

Step 2

Comprises a step of curing the layer of the curable composition by irradiation with an electron beam.

Electron Beam

It is thought that the electron beam plays two roles, that is, (1) as a curing trigger for the polymerizable compound and (2) as a trigger for generating an active radical for inducing grafting.

The active radical referred to here means a polymer radical generated by cleavage of the main chain of an organic polymer or a polymer radical generated as a result of hydrogen abstraction from a polymer chain by a radical species generated from a polymerizable compound.

In order to exhibit adhesion to an organic polymer substrate, it is important for an active radical to be generated from a polymer chain forming the organic polymer substrate to thus cause grafting, and the degree of grafting is proportional to the amount of active radical generated.

In order to produce a polymerization reaction only at the interface with an organic polymer substrate rather than deep into the substrate, suppressing any damage to the substrate, it is necessary to reduce the acceleration voltage, but if this is too low it is difficult to generate radicals, and the polymerization reaction does not proceed. An acceleration voltage that can achieve a balance between these two points is preferably 5 kV to 150 kV, more preferably 5 kV to 100 kV, and most preferably 5 kV to 50 kV.

Furthermore, from the viewpoint of production speed and the degree of polymerization of a polymerizable compound, the absorbed dose is preferably 1 kGy to 200 kGy, more preferably 1 kGy to 70 kGy, and most preferably 1 kGy to 30 kGy.

The absorbed dose of the electron beam referred to here was determined as follows. A dose measurement film (FWT-60-00, thickness 44.5 μm, manufactured by Far West Technology, Inc.) was irradiated with a standard radiation source ($^{60}$Co gamma ray), and the correlation between the received irradiation dose and film absorbance was determined. Subsequently, the received irradiation dose of a film irradiated with the standard radiation source that showed the same absorbance as the absorbance of a film that had been colored by irradiation with the electron beam was defined as the absorbed dose of the electron beam.

The thickness of a cured coating obtained by the process for producing a cured coating of the present invention is preferably 0.1 to 1,000 μm, more preferably 0.1 to 100 μm, and yet more preferably 0.1 to 10 μm.

In accordance with the present invention, there can be provided an electron beam-curable composition that is highly sensitive to an electron beam, has excellent storage stability, and can form on an organic polymer substrate a coating with good adhesion, and to provide a process for producing on an organic polymer substrate a cured coating having excellent adhesion.

EXAMPLES

The present invention is explained below more specifically by reference to Examples and Comparative Examples. However, the present invention is not limited by these Examples. Abbreviations for compounds used in the Examples and Comparative Examples are explained below. Mn denotes number-average molecular weight.

Polymerizable Compounds

As polymerizable compounds, A-15, A-28, B-1, C-13, D-3, D-17, D-29, E-10, F-3, G-5, G-9, and G-10, which are compound examples of Formula (I) above, were used.

PE4A: pentaerythritol tetraacrylate (manufactured by Kyoeisha Chemical Co., Ltd., Mn=352)

BADGDA: bisphenol A diglycidyl ether diacrylate (manufactured by Kyoeisha Chemical Co., Ltd., Mn=484)

BS575: hexafunctional urethane acrylate (manufactured by Arakawa Chemical Industries, Ltd., Mn=818)

EB270: difunctional aromatic urethane acrylate (manufactured by Daicel-Cytec Company Ltd., Mn=about 1,500)

NDDA: nonanediol diacrylate (manufactured by Kyoeisha Chemical Co., Ltd., Mn=268)

TPGDA: tripropylene glycol diacrylate (manufactured by Toagosei Co., Ltd., Mn=300)

TMPTA3EO: trimethylolpropane triacrylate-ethylene oxide 3 mol adduct (manufactured by Kyoeisha Chemical Co., Ltd., Mn=429)

TMPTA: trimethylolpropane triacrylate (manufactured by Osaka Organic Chemical Industry Ltd., Mn=296)

TBA: t-butyl acrylate (manufactured by Osaka Organic Chemical Industry Ltd., Mn=128)

Photopolymerization Initiator

Irg907: 2-methyl-1{4-(methylthio)phenyl}-2-morpholino-propan-1-one (manufactured by Ciba Specialty Chemicals)

Pigments

LBFG7330: phthalocyanine-based pigment (manufactured by Toyo Ink Mfg. Co., Ltd.)

MA-11: carbon black (manufactured by Mitsubishi Chemical Corporation)

Dispersants

S24000SC: polymeric dispersant (manufactured by Avecia)

BYK-168: polymeric dispersant (manufactured by BYK Chemie Japan)

S5000: polymeric dispersant (manufactured by Avecia)

Surfactant

F-177: fluorine-based surfactant Megafac F-177 (manufactured by Dainippon Ink and Chemicals, Inc.)

Colorant A

Colorant A was prepared by mixing the components below.

| LBFG7330 | 13.7 parts |
| BYK-168 | 3.00 parts |
| S5000 | 0.48 parts |

Colorant B

Colorant B was prepared by mixing the components below.

| MA-11 | 14.4 parts |
| S2400SC | 2.65 parts |
| S5000 | 1.06 parts |

Example 1

| A-15 | 10 parts |
| Cyclohexanone | 20 parts |
| F-177 | 0.03 parts |

A curable composition prepared by mixing the components above was applied to a commercial non-treated PET film using a #4 bar coater so as to give a cured coating thickness of 1 μm. Subsequently, it was irradiated with an electron beam using an area beam type electron beam irradiator ('Curetron EBC-200-20-30', manufactured by Nisshin High Voltage Corporation) under conditions of an acceleration voltage of 100 kV and an irradiation dose of 20 kGy, thus giving a cured coating.

Evaluation of Adhesion

The cured coating thus obtained was cut in a cross shape using a cutter, and subjected to a cellophane peel test, the state of the coating remaining after peeling with cellophane tape was examined visually, and crosscut adhesion was evaluated using 5 rankings.

5: 4 crosscut square portions did not peel off.
4: 3 crosscut square portions did not peel off (only one square peeled off).
3: 2 crosscut square portions did not peel off (two squares peeled off).
2: 1 crosscut square portion did not peel off (three squares peeled off).
1: All squares peeled off.

The allowable level for a product was 3 or greater. The average value over two measurements is given in Table 1.

Evaluation of Storage Stability

A prepared curable composition was allowed to stand under high temperature conditions (60° C.) for 3 days, following this it was applied to a substrate and irradiated with an electron beam in the same manner or exposed to light, and evaluation of crosscut adhesion was carried out. The results are given in Table 1. When the figure did not change greatly, the result was good. The allowable level for a product was 3 or greater.

Examples 2 to 8 and Comparative Examples 1 to 8

Cured coatings were prepared in the same manner as in Example 1 except that the polymerizable compound was changed to those shown in Table 1, and adhesion and storage stability were evaluated. The results are given in Table 1.

Example 9

| D-17 | 10 parts |
| Colorant A | 3 parts |
| Cyclohexanone | 20 parts |
| F-177 | 0.03 parts |

A curable composition was prepared by charging a mayonnaise bottle with the components above and the same weight as the components of glass beads (diameter 2.0 mm), carrying out dispersion using a paint conditioner for 2 hours, and then removing the glass beads. A cured coating was prepared in the same manner as in Example 1 except for the above, and adhesion and storage stability were evaluated. The results are given in Table 1.

Examples 10 to 16 and Comparative Examples 9 to 16

Cured coatings were prepared in the same manner as in Example 9 except that the polymerizable compound, the colorant, and the irradiation dose of the electron beam were changed to those shown in Table 1, and adhesion and storage stability were evaluated. The results are given in Table 1.

Examples 17 and 18

Cured coatings were prepared in the same manner as in Example 1 except that the 2 types of polymerizable compounds shown in Table 1 were used in combination at the ratio by weight shown in the table, and adhesion and storage stability were evaluated. The results are given in Table 1.

Examples 19 and 20

Cured coatings were prepared in the same manner as in Example 9 except that the 2 types of polymerizable compounds shown in Table 1 were used in combination at the ratio by weight shown in the table, and adhesion and storage stability were evaluated. The results are given in Table 1.

Comparative Example 17

| A-15 | 10 parts |
| Irg907 | 3 parts |
| Cyclohexanone | 20 parts |
| F-177 | 0.03 parts |

A curable composition prepared by mixing the components above was applied to the surface of a PET film of the same type as in Example 1 using a #4 bar coater.

A cured coating was then prepared by irradiating it with UV rays using 2 mercury lamps of 80 W and 120 W from a distance of 20 cm, and adhesion and storage stability were evaluated. The results are given in Table 1.

Comparative Examples 18 to 24

Cured coatings were prepared in the same manner as in Comparative Example 17 except that the polymerizable compound was changed to those shown in Table 1, and adhesion and storage stability were evaluated. The results are given in Table 1.

Comparative Example 25

| D-17 | 10 parts |
| Irg907 | 3 parts |
| Colorant A | 3 parts |
| Cyclohexanone | 20 parts |
| F-177 | 0.03 parts |

A curable composition was prepared by charging a mayonnaise bottle with the components above and the same weight as the components of glass beads (diameter 2.0 mm), carrying out dispersion using a paint conditioner for 2 hours, and then removing the glass beads. A cured coating was prepared in the same manner as in Comparative Example 17 except for the above, and adhesion and storage stability were evaluated. The results are given in Table 1.

Comparative Examples 26 to 28

Cured coatings were prepared in the same manner as in Comparative Example 25 except that the polymerizable compound and the colorant were changed to those shown in Table 1, and adhesion and storage stability were evaluated. The results are given in Table 1.

From the results shown in Table 1, the electron beam-curable composition of the present invention exhibited high sensitivity and high adhesion, particularly in curing with an electron beam, and storage stability was also good.

Furthermore, the electron beam-curable composition of the present invention showed good adhesion to polyamide, polyester, polycarbonate, cellulose derivatives, and polyimide.

a step of forming on an organic polymer substrate a layer of a curable composition comprising at least one compound represented by Formula (I); and a step of curing the layer of the curable composition by irradiating with an electron beam,

in Formula (I), $Q^1$ denotes a cyano group or a —$COX^2$ group, $X^1$ denotes a hydrogen atom, organic residue, or polymer chain bonded to carbon atom $C^A$ via a heteroatom, or a halogen atom, $X^2$ denotes a hydrogen atom, organic residue, or polymer chain bonded to the carbo-

| Ex. Comp. Ex. | Polymerizable compound | Photopolymerization initiator | Colorant | Electron beam dose (kGy) | Light intensity (mJ/cm$^2$) | Adhesion | Storage stability |
|---|---|---|---|---|---|---|---|
| Ex. 1 | A-15 | None | None | 20 | — | 4 | 4 |
| Ex. 2 | A-28 | None | None | 20 | — | 4 | 4 |
| Ex. 3 | B-1 | None | None | 20 | — | 5 | 5 |
| Ex. 4 | C-13 | None | None | 20 | — | 5 | 5 |
| Ex. 5 | D-3 | None | None | 20 | — | 5 | 5 |
| Ex. 6 | D-29 | None | None | 20 | — | 5 | 5 |
| Ex. 7 | E-10 | None | None | 20 | — | 5 | 5 |
| Ex. 8 | G-5 | None | None | 20 | — | 5 | 5 |
| Ex. 9 | D-17 | None | A | 20 | — | 4 | 4 |
| Ex. 10 | G-10 | None | A | 20 | — | 4 | 4 |
| Ex. 11 | F-3 | None | B | 20 | — | 4 | 4 |
| Ex. 12 | G-9 | None | B | 20 | — | 4 | 4 |
| Ex. 13 | D-17 | None | A | 10 | — | 3.5 | 3.5 |
| Ex. 14 | G-9 | None | A | 10 | — | 3.5 | 3.5 |
| Ex. 15 | D-17 | None | B | 5 | — | 3 | 3 |
| Ex. 16 | G-9 | None | B | 5 | — | 3 | 3 |
| Ex. 17 | A-15/A-38 = 70/30 | None | None | 20 | — | 5 | 4 |
| Ex. 18 | A-28/D-2 = 70/30 | None | None | 20 | — | 5 | 5 |
| Ex. 19 | C-13/E-2 = 70/30 | None | A | 20 | — | 5 | 5 |
| Ex. 20 | A-15/G-5 = 70/30 | None | A | 20 | — | 4 | 4 |
| Comp. Ex. 1 | TBA | None | None | 20 | — | 0 | 0 |
| Comp. Ex. 2 | PE4A | None | None | 20 | — | 2 | 1 |
| Comp. Ex. 3 | BADGDA | None | None | 20 | — | 1 | 0 |
| Comp. Ex. 4 | BS575 | None | None | 20 | — | 2 | 1 |
| Comp. Ex. 5 | EB270 | None | None | 20 | — | 1 | 0 |
| Comp. Ex. 6 | NDDA | None | None | 20 | — | 2 | 1 |
| Comp. Ex. 7 | TPGDA | None | None | 20 | — | 2 | 1 |
| Comp. Ex. 8 | TMPTA | None | None | 20 | — | 2 | 1 |
| Comp. Ex. 9 | BADGDA | None | A | 20 | — | 1 | 0 |
| Comp. Ex. 10 | TMPTA3EO | None | A | 20 | — | 2 | 0 |
| Comp. Ex. 11 | BADGDA | None | B | 20 | — | 1 | 0 |
| Comp. Ex. 12 | TMPTA3EO | None | B | 20 | — | 1 | 0 |
| Comp. Ex. 13 | BADGDA | None | A | 10 | — | 0 | 0 |
| Comp. Ex. 14 | TMPTA3EO | None | A | 10 | — | 0 | 0 |
| Comp. Ex. 15 | BADGDA | None | B | 5 | — | 0 | 0 |
| Comp. Ex. 16 | TMPTA3EO | None | B | 5 | — | 0 | 0 |
| Comp. Ex. 17 | A-15 | Irg907 | None | — | 200 | 1 | 0 |
| Comp. Ex. 18 | A-28 | Irg907 | None | — | 200 | 1 | 0 |
| Comp. Ex. 19 | B-1 | Irg907 | None | — | 200 | 2 | 1 |
| Comp. Ex. 20 | C-13 | Irg907 | None | — | 200 | 1 | 0 |
| Comp. Ex. 21 | D-3 | Irg907 | None | — | 200 | 2 | 1 |
| Comp. Ex. 22 | D-29 | Irg907 | None | — | 200 | 2 | 1 |
| Comp. Ex. 23 | E-10 | Irg907 | None | — | 200 | 1 | 0 |
| Comp. Ex. 24 | G-5 | Irg907 | None | — | 200 | 2 | 1 |
| Comp. Ex. 25 | D-17 | Irg907 | A | — | 200 | 0 | 0 |
| Comp. Ex. 26 | G-10 | Irg907 | A | — | 200 | 0 | 0 |
| Comp. Ex. 27 | F-3 | Irg907 | B | — | 200 | 0 | 0 |
| Comp. Ex. 28 | G-9 | Irg907 | B | — | 200 | 0 | 0 |

Colorant A: LBFG7330/BYK-168/S5000 = 13.7/3.00/0.48 (parts by weight)
Colorant B: MA-11/S2400SC/S5000 = 14.4/2.65/1.06 (parts by weight)

What is claimed is:

1. A process for producing a cured coating, the process comprising:

nyl group via a heteroatom, or a halogen atom, $R^a$ and $R^b$ independently denote a hydrogen atom, a halogen atom, a cyano group, or an organic residue, and $X^1$ and $X^2$, $R^a$ and $R^b$, and $X^1$ and $R^a$ or $R^b$ may be bonded to each other to form a cyclic structure, wherein the curable composition does not comprise a polymerization initiator, the acceleration voltage for irradiation with the electron beam is 5 to 150 kV, and the irradiance of the electron beam is 1 to 200 kGy.

2. The process for producing a cured coating according to claim 1, wherein the only polymerizable component contained in the curable composition is a compotind represented by Formula (I).

3. The process for producing a cured coating according to claim 1, wherein $X^1$ is an organic residue or polymer chain that has at least one bond selected from the group consisting of an ether bond, a carboxylic acid ester bond, a thioether bond, and a thioester bond.

4. The process for producing a cured coating according to claim 3, wherein $X^1$ is a group selected from the group consisting of a hydroxy group, a substituted oxy group, a mercapto group, a substituted thio group, an amino group, a substituted amino group, a sulfo group, a substituted sulfo group, a sulfonato group, a substituted sulfinyl group, a substituted sulfonyl group, a phosphono group, a substituted phosphono group, a phosphonato group, a substituted phosphonato group, a nitro group, and a heterocyclic group linked via a heteroatom, or a polymer chain bonded to carbon atom $C^A$ via an oxygen atom, a nitrogen atom, a sulfur atom, or a phosphorus atom.

5. The process for producing a cured coating according to claim 1, wherein $Q^1$ is a —$COX^2$ group.

6. The process for producing a cured coating according to claim 5, wherein $X^2$ is a hydroxy group, a substituted oxy group, a mercapto group, a substituted thio group, an amino group, a substituted amino group, a heterocyclic group (provided that it is linked to the carbonyl group via a heteroatom in the heterocycle), or a polymer chain bonded to the carbonyl group via a heteroatom.

7. The process for producing a cured coating according to claim 1, wherein the electron beam-curable composition comprises a colorant.

8. The process for producing a cured coating according to claim 1, wherein the electron beam-curable composition comprises a surfactant.

9. The process for producing a cured coating according to claim 1, wherein the cured coating has a thickness of 0.1 to 1,000 μm.

10. The process for producing a cured coating according to claim 1, wherein the compound represented by Formula (I) is a compound represented by Formulae (I-A) to (I-F) or a compound having a structural unit represented by Formulae (I-G-1) to (I-G-4),

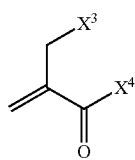

(I-A)

wherein $X^3$ denotes a hydroxyl group, a heterocyclic group bonded via a heteroatom, a straight-chain or branched alkoxy group having 1 to 10 carbon atoms, a straight-chain or branched substituted alkoxy group having 1 to 15 carbon atoms, an acyloxy group having 1 to 10 carbon atoms, an aryloxy group having 6 to 12 carbon atoms, or a substituted aryloxy group having 6 to 20 carbon atoms, or a halogen atom, and $X^4$ denotes a hydroxyl group, a straight-chain or branched alkoxy group having 1 to 12 carbon atoms, a straight-chain or branched substituted alkoxy group having 1 to 20 carbon atoms, an aryloxy group having 6 to 18 carbon atoms, or a substituted aryloxy group having 6 to 20 carbon atoms,

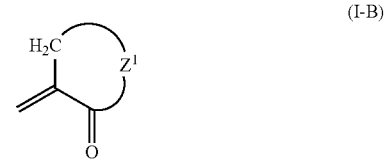

(I-B)

wherein $Z^1$ denotes a divalent linking group having at both ends a heteroatom such as an oxygen atom, a nitrogen atom, or a sulfur atom, and the ring containing $Z^1$ is a 4-membered, 5-membered, 6-membered, 7-membered or 8-membered aliphatic ring,

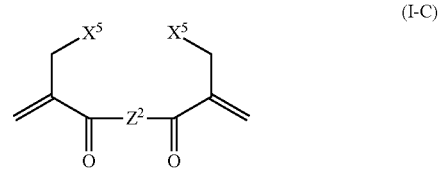

(I-C)

wherein $X^5$s independently denote a hydroxyl group, a straight-chain or branched alkoxy group having 1 to 10 carbon atoms, a straight-chain or branched substituted alkoxy group having 1 to 10 carbon atoms, an acyloxy group having 2 to 10 carbon atoms, an aryloxy group having 6 to 12 carbon atoms, or a substituted aryloxy group having 6 to 20 carbon atoms, and $Z^2$ denotes a divalent linking group having a heteroatom at both ends, and $Z^2$ is a group having no more than 50 carbon atoms,

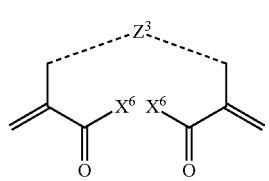

(I-D)

wherein $X^6$s independently denote a straight-chain or branched alkoxy group having 1 to 10 carbon atoms, a straight-chain or branched substituted alkoxy group having 1 to 10 carbon atoms, an aryloxy group having 6 to 12 carbon atoms, a substituted aryloxy group having 6 to 12 carbon atoms, or a halogen atom, and $Z^3$ denotes a divalent linking group having a heteroatom at both ends, and $Z^3$ is a group having no more than 50 carbon atoms, (I-E)

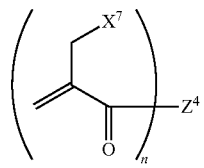

wherein
$X^7$s independently denote a hydroxyl group, a straight-chain or branched alkoxy group having 1 to 10 carbon atoms, a straight-chain or branched substituted alkoxy group having 1 to 10 carbon atoms, an aryloxy group having 6 to 12 carbon atoms, a substituted aryloxy group having 6 to 12 carbon atoms, an acyloxy group having 2 to 10 carbon atoms, or a substituted acyloxy group having 2 to 10 carbon atoms, or a halogen atom,
$Z^4$ denotes a tri- or higher-valent linking group bonded to the carbonyl group via a heteroatom, and
n denotes an integer of 3 or greater, (I-F)

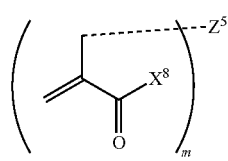

wherein
$X^8$s independently denote a straight-chain or branched alkoxy group having 1 to 15 carbon atoms, a straight-chain or branched substituted alkoxy group having 1 to 15 carbon atoms, an aryloxy group having 6 to 12 carbon atoms, or a substituted aryloxy group having 6 to 15 carbon atoms,
$Z^5$ denotes a tri- or higher-valent linking group bonded to $X^8COC(=CH_2)CH_2$— via a heteroatom, and
m denotes an integer of 3 or greater, (I-G-1)

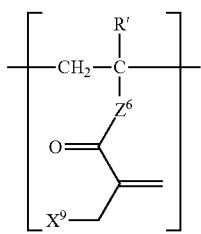

wherein
$X^9$ denotes a hydrogen atom or monovalent organic residue bonded via a heteroatom, or a halogen atom,
$Z^6$ denotes a divalent linking group, and
R' denotes a hydrogen atom or a methyl group, (I-G-2)

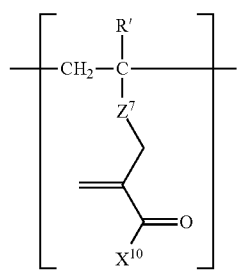

wherein $X^{10}$ denotes a monovalent organic residue bonded via a heteroatom,
$Z^7$ denotes a divalent linking group, and
R' denotes a hydrogen atom or a methyl group, (I-G-3)

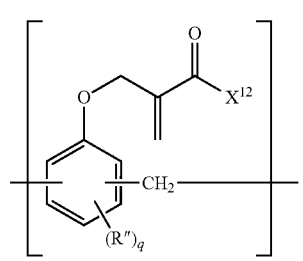

wherein
$X^{11}$ denotes a hydrogen atom or monovalent organic residue bonded via a heteroatom, or a halogen atom,
R" denotes a methyl group, and
p denotes 0 or 1, (I-G-4)

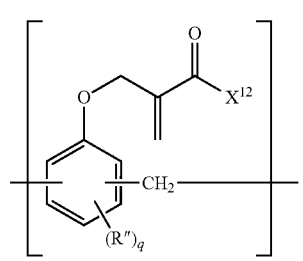

$X^{12}$ denotes a monovalent organic residue bonded via a heteroatom,
R" denotes a methyl group, and
q denotes 0 or 1.

* * * * *